United States Patent
Daubresse et al.

(10) Patent No.: US 11,987,526 B2
(45) Date of Patent: *May 21, 2024

(54) MULTILAYER INSULATING CONSTRUCTION SYSTEM FOR A BUILDING—METHOD FOR ITS MANUFACTURE—DRY COMPOSITION FOR USE IN SUCH MANUFACTURE

(71) Applicant: PAREXGROUP SA, Issy les Moulineaux (FR)

(72) Inventors: Anne Daubresse, Saint Quentin Fallavier (FR); Eric Sanchez, Saint Quentin Fallavier (FR); Marco Cappellari, Saint Quentin Fallavier (FR)

(73) Assignee: PAREXGROUP SA, Issy-les-Moulineaux (FR)

( * ) Notice: Subject to any disclaimer, the term of this patent is extended or adjusted under 35 U.S.C. 154(b) by 1354 days.

This patent is subject to a terminal disclaimer.

(21) Appl. No.: 16/346,998

(22) PCT Filed: Nov. 2, 2017

(86) PCT No.: PCT/FR2017/053007
§ 371 (c)(1),
(2) Date: May 2, 2019

(87) PCT Pub. No.: WO2018/083421
PCT Pub. Date: May 11, 2018

(65) Prior Publication Data
US 2019/0256421 A1    Aug. 22, 2019

(30) Foreign Application Priority Data
Nov. 3, 2016 (FR) ..................... 16 60654

(51) Int. Cl.
*E04B 1/02* (2006.01)
*C04B 18/24* (2006.01)
(Continued)

(52) U.S. Cl.
CPC ............ *C04B 28/12* (2013.01); *C04B 18/248* (2013.01); *C04B 28/02* (2013.01); *C04B 28/10* (2013.01);
(Continued)

(58) Field of Classification Search
CPC ....... C04B 28/12; C04B 18/248; C04B 28/02; C04B 28/10; C04B 2111/00146;
(Continued)

(56) References Cited

U.S. PATENT DOCUMENTS 2,083,961 A   6/1937  Gustave
4,210,457 A * 7/1980  Dodson .................. C04B 28/04
                                                    106/676
(Continued)

FOREIGN PATENT DOCUMENTS

BR    112019009001 A2    7/2019
CN    101 074 156        5/2010
(Continued)

OTHER PUBLICATIONS

Magniont et al., "Use of plant aggregates in building ecomaterials", European Journal of Environmental and Civil Engineering, vol. 16, No. sup1, Jun. 2012.
(Continued)

*Primary Examiner* — Phi D A
(74) *Attorney, Agent, or Firm* — Oliff PLC

(57) ABSTRACT

The aim of the invention is to provide a novel construction system for buildings, having the properties of being multilayer, insulating, ductile, and lightweight.
(Continued)

To this end, the invention relates to a multilayer insulating construction system for a building, characterized in that (a) this system comprises at least one wall associated with at least one hardened insulation layer, (b) the maximum thickness of the hardened insulation layer is between 1 and 60 cm, (c) the hardened insulation has a bulk density (BD) in kg/m$^3$ that is less than or equal to 450; 300; 250; 200; 150; 100; and more preferably between 50 and 300; 150 and 250;

(d) this hardened insulation layer is prepared by mixing, with water, a dry composition (d) comprising:

-A at least one binder including:
  -A1- at least one hydraulic or air binder;
  -A2- possibly at least one water retention agent
  -A3- possibly at least one surfactant;

-B- at least one bio-sourced aggregate based on sunflower stalk and/or corn stalk and/or rape stalk, having a Bulk Density(BD) in kg/m$^3$ that is less than 110; preferably between 10 and 80;

(e) this composition having a ratio of A/B [mass of dry binder -A- in kg]/[mass of dry filler -B- in kg] comprised between 1 and 10.

Another object of the invention is the dry composition which, after mixing with water, enables manufacturing the hardened insulation layer of this construction system. The invention also includes the method for manufacturing the construction system.

13 Claims, 16 Drawing Sheets

(51) Int. Cl.
*C04B 28/02* (2006.01)
*C04B 28/10* (2006.01)
*C04B 28/12* (2006.01)
*E04C 2/288* (2006.01)
*C04B 111/00* (2006.01)
*C04B 111/28* (2006.01)
*C04B 111/60* (2006.01)
*E04B 1/74* (2006.01)

(52) U.S. Cl.
CPC ............... *E04B 1/02* (2013.01); *E04C 2/288* (2013.01); *C04B 2111/00146* (2013.01); *C04B 2111/00482* (2013.01); *C04B 2111/00517* (2013.01); *C04B 2111/00612* (2013.01); *C04B 2111/28* (2013.01); *C04B 2111/60* (2013.01); *E04B 2001/745* (2013.01); *Y02W 30/91* (2015.05)

(58) Field of Classification Search
CPC . C04B 2111/00482; C04B 2111/00517; C04B 2111/00612; C04B 2111/28; C04B 2111/60; C04B 16/02; C04B 2111/40; C04B 2201/30; E04B 1/02; E04B 2001/745; E04C 2/288; Y02W 30/91; Y02A 30/244
See application file for complete search history.

(56) References Cited

U.S. PATENT DOCUMENTS

| | | | | |
|---|---|---|---|---|
| 5,641,584 | A * | 6/1997 | Andersen | B28B 3/126 106/713 |
| 5,662,731 | A * | 9/1997 | Andersen | B29C 43/38 106/206.1 |
| 5,683,772 | A * | 11/1997 | Andersen | B29C 70/025 428/53 |
| 2011/0223384 | A1* | 9/2011 | Whitaker | C04B 18/02 427/221 |
| 2012/0267562 | A1* | 10/2012 | Thichy | C04B 28/02 252/62 |
| 2012/0328788 | A1* | 12/2012 | Willimann | C04B 40/0039 524/297 |
| 2013/0167756 | A1* | 7/2013 | Chen | C04B 28/021 106/789 |
| 2013/0192783 | A1* | 8/2013 | Devenney | C04B 28/10 162/181.2 |
| 2013/0216762 | A1* | 8/2013 | Chan | C04B 28/14 428/70 |
| 2015/0152005 | A1* | 6/2015 | Leblanc | C04B 20/1074 521/146 |
| 2016/0100614 | A1* | 4/2016 | Takamura | A23L 13/50 426/631 |
| 2018/0311675 | A1* | 11/2018 | Park | B02C 21/00 |
| 2020/0055777 | A1 | 2/2020 | Cappellari | |

FOREIGN PATENT DOCUMENTS

| | | |
|---|---|---|
| DE | 19505989 A1 | 8/1996 |
| DE | 19610247 A1 | 2/1997 |
| EP | 3 031 868 | 6/2016 |
| FR | 384903 A | 4/1908 |
| FR | 2 923 242 | 5/2009 |
| FR | 2 946 641 | 12/2010 |
| FR | 2957016 A1 | 9/2011 |
| FR | 3016377 A1 | 7/2015 |
| FR | 3034415 A1 | 10/2016 |
| RU | 92 000 575 A | 3/1997 |
| RU | 52 878 U1 | 4/2006 |
| RU | 2 447 044 C2 | 4/2012 |
| WO | 2014/072533 | 5/2014 |
| WO | 2015/082513 | 6/2015 |
| WO | 2015/082515 A1 | 6/2015 |
| WO | 2016/051085 A1 | 4/2016 |
| WO | 2017/077246 A1 | 5/2017 |

OTHER PUBLICATIONS

Binici et al., "An environmentally friendly thermal insulation material from sunflower stalk, textile waste and stubble fibres", Construction and Building Materials, vol. 51, 2014, pp. 24-33.

Chabannes, M., et al., "Design and multi-physical properties of a new insulating concrete using sunflower stem aggregates and eco-friendly binders," Materials and Structures (2015) 48:1815-1829.

Mar. 30, 2021 Translation of Office Action and Search Report issued in Russian Patent Application No. 2019116880.

Jean-Dennis Mathias et al; "Upcycling Sunflower Stems as Natural Fibers for Biocomposite Application"; BioResources.com; vol. 10; No. 4; 2015; pp. 8076-8088.

Jun. 2, 2020 Office Action cited in Singapore Patent Application No. 11201903988V.

Apr. 14, 2020 Office Action issued in France Patent Application No. FR1660654.

May 11, 2020 Office Action issued in Chilean Patent Application No. PCT 2019-001219.

Jan. 31, 2018 Written Opinion issued in International Application No. PCT/FR2017/053007.

\* cited by examiner

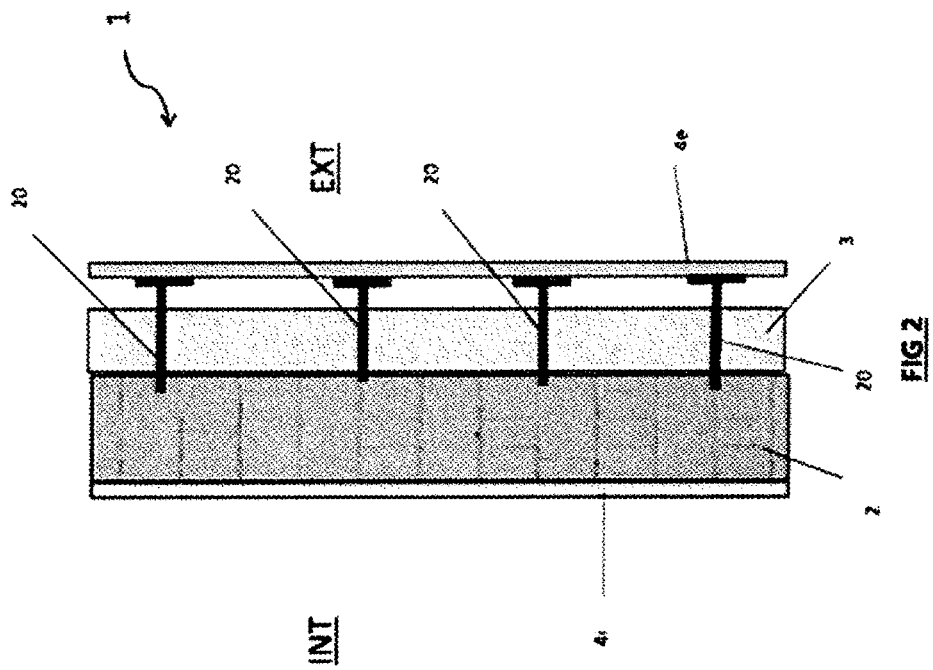
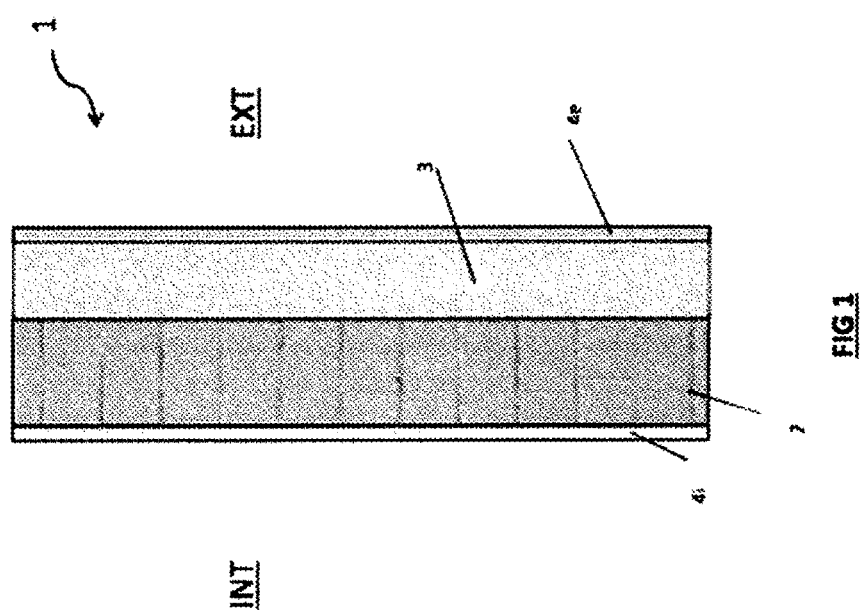

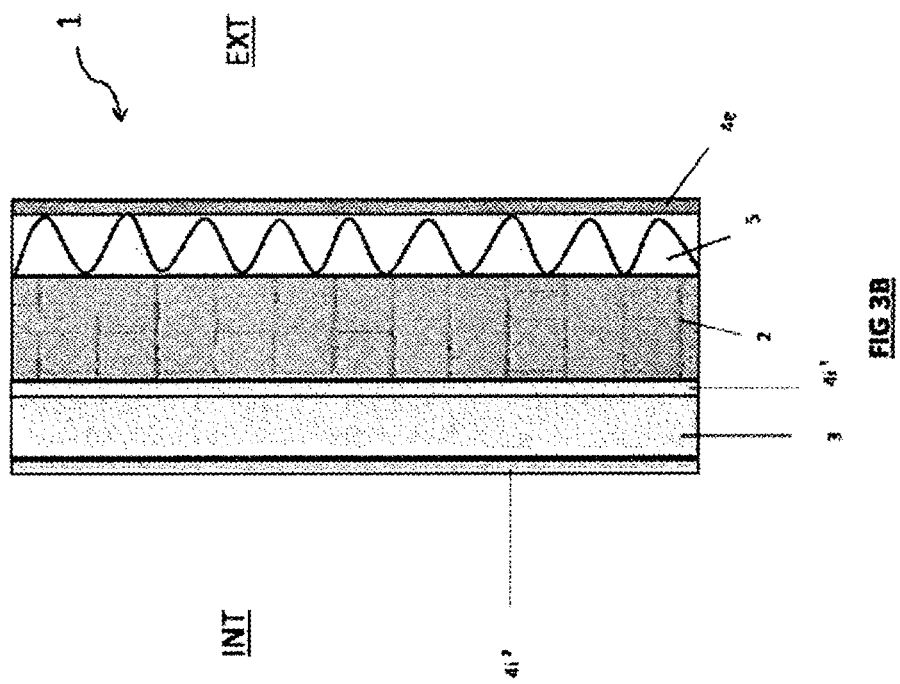

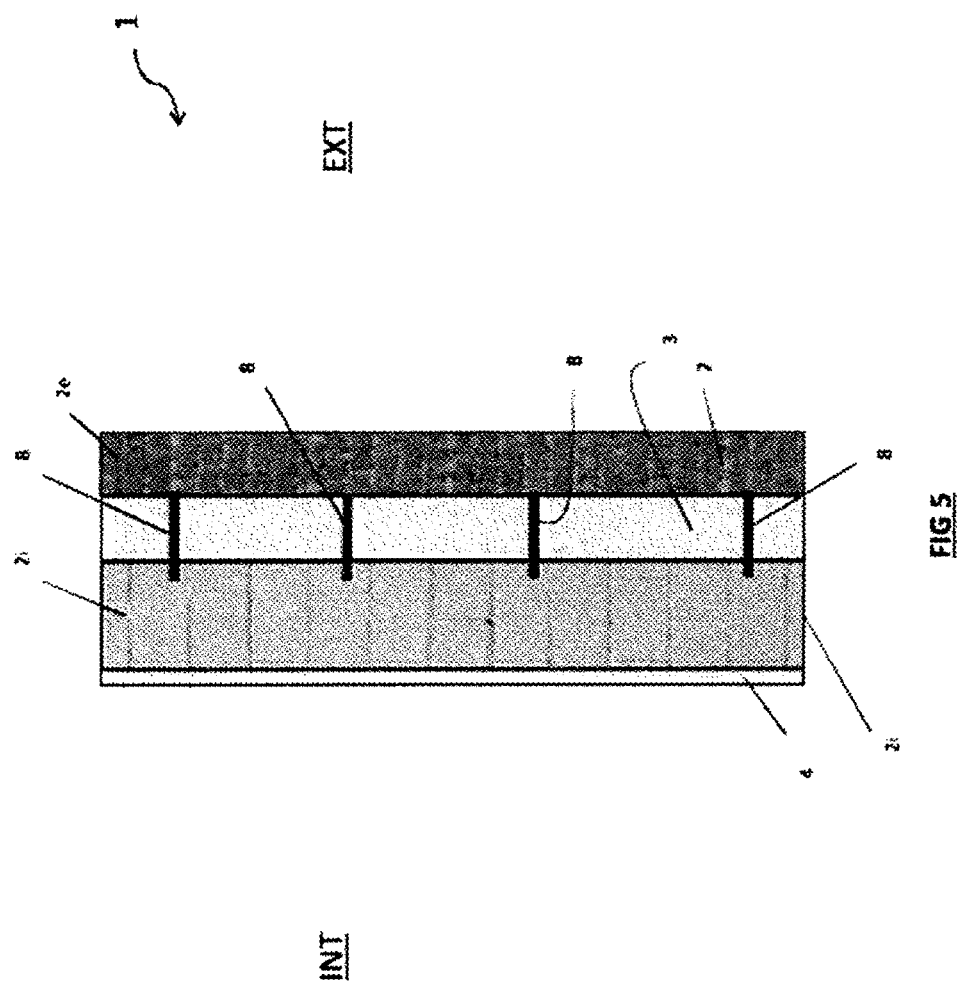

MULTILAYER INSULATING CONSTRUCTION SYSTEM FOR A BUILDING—METHOD FOR ITS MANUFACTURE—DRY COMPOSITION FOR USE IN SUCH MANUFACTURE

TECHNICAL FIELD

The technical field of the invention is that of multilayer and insulating construction systems made use of in the creation of buildings.

The systems concerned by the invention are of the type comprising at least one wall associated with at least one hardened insulation layer.

The invention also relates to the raw materials used for the manufacture of the construction system, in particular dry compositions of concrete or mortar which are the raw material of the hardened insulation layer.

A specific binder formulation, the wet forms of these compositions, and their preparation, as well as their applications in construction, are also an integral part of the invention.

The invention also relates to the manufacture of the multilayer insulating construction system as well as the preparation and packaging of the dry mortar and concrete compositions.

Finally, the invention also covers kits for manufacturing said construction systems and in particular their insulation layer, as well as buildings created using this construction system.

TECHNOLOGICAL BACKGROUND

The construction systems according to the invention comprise at least one wall of any type, and at least one hardened insulation layer.

Said layer is obtained after drying a wet formulation obtained by mixing with water (batch mixing) a dry construction composition comprising at least one binder and aggregates, as well as any functional additives.

The binders are inorganic and/or organic, preferably inorganic. The aggregates particularly considered in the context of the invention are bio-sourced aggregates which replace or supplement the inorganic aggregates.

The bio-sourced aggregates (or fillers) are derived from biomass of plant or animal origin, preferably plant.

These construction compositions are concretes or mortars.

The construction systems concerned in the context of the invention are:
prefabricated or manufactured on site by applying the wet composition of concrete or mortar: onto horizontal surfaces by spreading, onto vertical surfaces by spraying,
or prefabricated or manufactured on site by pouring and casting this wet composition in molds or formwork;
or consist of unitary members for the construction of buildings, such as cinder blocks, quarry stone, bricks, concrete blocks, etc., these members being generally standardized and prefabricated and intended for the construction of walls, ceilings, or floors.

The associated wall constitutes the substrate onto which the wet composition is applied, or the wall against which the hardened insulation layer formed by molding in a mold or formwork is constructed.

The construction systems according to the invention are inspired by the current regulatory and political context of reducing the environmental footprint of buildings, reducing the consumption of fossil-based raw materials, reducing greenhouse gas emissions, and promoting the economics of sustainable development. This is the reason why the use of bio-sourced plant aggregates/fillers in construction compositions is booming.

Plant-based raw materials already used in the building and construction sector include: wools from plant fibers, recycled natural textiles, cellulose wadding, straw from hemp or hemp chaff, hemp in other forms, flax shives, straw in baled or compressed form, wood in all its forms, etc.

These plant-based raw materials are known for their thermal and acoustic insulating properties and for their properties as reinforcements, fillers, and matrices.

The use of such plant-based raw materials in construction compositions, however, poses a number of difficulties, which include:
very strongly hydrophilic and hyperabsorbent properties which result in excess water;
excess water which lengthens drying and delays setting;
excess water which has an impact on the mechanical strength of the hardened compositions (for example compressive strength);
excess water which affects the durability of the hardened compositions;
excess water which promotes the development of microorganisms that degrade the health and safety qualities of the hardened compositions.

Plant-based aggregates/fillers are generally characterized by a high water absorption capacity linked to their highly porous structure. For example, hemp straw, an aggregate/filler that comes from hemp stalk, is able to absorb water up to 3-4 times its weight.

In addition to these thermal and sound insulation specifications, building construction systems must also meet certain mechanical properties. In particular, it is very important that these building systems have the ductility required to withstand the dimensional variations to which buildings are subjected, due to thermal, hygrometric, and seismic environmental stresses.

Despite the disadvantages related to the very strongly hydrophilic and hyperabsorbent nature of bio-sourced plant aggregates known to the present time, the inventors postulated, as part of an inventive step, that it is not impossible to turn these disadvantages into advantages, particularly in the quest to improve the mechanical properties of construction systems for buildings.

To give structure to this approach, the inventors therefore set the following objectives.

OBJECTIVES OF THE INVENTION

The invention aims to satisfy at least one of the following objectives:
provide a new construction system for buildings, having the features of being multilayer, insulating, ductile, and lightweight.
provide a new construction system for buildings which has low thermal conductivity (X).
provide a new construction system for buildings which offers durable mechanical performance, even in severe meteorological conditions and/or other natural occurrences, for example, respectively, freeze-thaw or freeze-frost cycles within 28 days of construction and ground movement.
provide a new construction system for buildings which has limited vulnerability to damage caused by the growth of micro-organisms, rodent activity, or even fire;

provide a new construction system for buildings, in which the structure, particularly the insulating structure, is homogeneous, in order to provide good thermal and acoustic insulation.

provide a new construction system for buildings which can be easily and simply prefabricated or manufactured on site "in situ", by non-specialist construction workers using conventional techniques, without posing any risks to the quality of the construction.

provide a new construction system for buildings that is economical.

provide a dry mortar/concrete composition comprising plant-based raw materials and enabling the production of a hardened insulation layer, integrated into the construction system referred to in the above objectives.

provide a dry mortar/concrete composition comprising plant-based raw materials and enabling the production of a hardened insulation layer, integrated into the construction system referred to in the above objectives, with an intermediate step which involves a wet composition of suitable viscosity to allow simple and homogeneous deposition on a substrate, and/or simple and homogeneous casting in a mold or formwork, and to allow doing so in a repeatable manner.

provide a kit comprising the bio-sourced aggregates/fillers and the binder intended for preparing the dry composition, then the wet composition, for the manufacture of the construction system referred to in the above objectives.

provide a simple and economical method for manufacturing a construction system satisfying at least one of the above objectives.

BRIEF DESCRIPTION OF THE INVENTION

After long and laborious research and testing, the inventors have successfully selected a particular class of bio-sourced aggregates of plant origin, suitable for constructing a hardened insulation layer, combined with at least one wall, for forming an improved construction system for buildings that meets the above and other objectives.

A first aspect of the present invention therefore relates to a multilayer and insulating construction system for a building, characterized in that
a) this system comprises at least one wall associated with at least one hardened insulation layer,
b) the maximum thickness of the hardened insulation layer is between 1 and 60 cm,
c) the hardened insulation has a Bulk Density (BD) in kg/m$^3$ that is less than or equal to 450; 300; 250; 200; 150; 100; and more preferably between 50 and 300; 150 and 250;
d) this hardened insulation layer is prepared by mixing, with water, a dry composition (d) comprising:
   -A- at least one binder including:
      -A1- at least one hydraulic or air binder;
      -A2- possibly at least one water retention agent;
      -A3- possibly at least one surfactant;
   -B- at least one bio-sourced aggregate based on sunflower stalk and/or corn stalk and/or rape stalk, having a Bulk Density (BD) in kg/m$^3$ that is less than 110; preferably between 10 and 80;
e) this composition having a ratio of A/B [mass of dry binder -A- in kg]/[mass of dry filler -B- in kg] comprised between—by increasing order of preference—1 and 15; 1 and 10; 1 and 8; 1 and 6.

It is to the credit of the inventors that they have successfully developed this bio-sourced, insulating, lightweight, and ductile construction system for buildings.

Not wanting to be constrained by current theory, this advantageous construction system was able to be obtained by counter-intuitively choosing a particular bio-sourced aggregate -B- and combining this component B with a binder A, in suitable quantities and in a manner that would obtain a hardened insulation having a BD within a given range.

Advantageously, this construction system is in the form of prefabricated members intended to be assembled on site for the construction of the building or is manufactured on site for the construction of the building.

In one embodiment, this construction system is in the form of unitary masonry members, preferably standardized and prefabricated, intended to be assembled on site for the construction of the building or parts of the building, preferably walls.

Preferably, the hardened insulation layer is interposed between the associated wall and at least one other wall and/or at least one layer of a material different from the hardened insulation, this other wall and/or this layer possibly being a finishing wall or a finishing layer.

According to a preferred embodiment of the invention, the percentage of stalk pith in the bio-sourced aggregate is (as % weight on a dry basis and in increasing order of preference) >15; ≥20; ≥30; ≥40; ≥50; ≥60; ≥70; ≥80; ≥90; ≥95; ≥99.

The construction system according to the invention may be an External Thermal Insulation system—ETI—or an Internal Thermal Insulation system—ITI.

According to another of its aspects, the invention relates to unitary masonry members, in particular those referred to above, preferably standardized and prefabricated, and intended to be assembled on site for the construction of the building or parts of the building, preferably walls, characterized in that
a) each member comprises at least one wall associated with at least one hardened insulation layer,
b) the maximum thickness of the hardened insulation layer is between 1 and 60 cm,
c) the hardened insulation has a Bulk Density (BD) in kg/m$^3$ that is less than or equal to 450; 300; 250; 200; 150; 100; and more preferably between 50 and 300; 150 and 250;
d) this hardened insulation layer is prepared by mixing, with water, a dry composition (d) comprising:
   -A- at least one binder including:
      -A1- at least one hydraulic or air binder;
      -A2- possibly at least one water retention agent;
      -A3- possibly at least one surfactant;
   -B- at least one biosourced aggregate based on sunflower stalk and/or corn stalk and/or rape stalk, having a Bulk Density (BD) in kg/m$^3$ that is less than 110; preferably between 10 and 80;
e) this composition having a ratio of A/B [mass of dry binder -A- in kg]/[mass of dry filler -B- in kg] comprised between—in increasing order of preference—1 and 15; 1 and 10; 1 and 8; 1 and 6.

According to another of its aspects, the invention relates to a dry composition (d) which is particularly useful in the system according to the invention, containing at least one bio-sourced aggregate B based on sunflower stalks and/or corn stalks and/or rape stalks having a Bulk Density (BD) in kg/m$^3$ that is less than 110; preferably between 10 and 80; the BD being defined according to method M1.

After mixing with water, this dry composition can form a wet composition suitable for use in conventional processes of the construction trades, namely pumping, spraying onto a vertical, inclined, or even horizontal (on the floor or raised)

substrate, casting in a mold or formwork or pouring to create a screed on a floor, and doing so without losing the desired insulating character of the insulation layer comprised in the construction system according to the invention.

According to another of its aspects, the invention relates to a kit separately comprising packaging containing a bio-sourced aggregate B as referred to above and packaging containing a binder A as referred to above, as well as instructions for using the kit to manufacture hardened insulation layers, in the construction system according to the invention.

Another aspect of the invention relates to a method for manufacturing the construction system according to the invention.

Definitions

Throughout this present description, any use of the singular indiscriminately denotes the singular or the plural.

The definitions given below as examples may be used in interpreting the present description:

"construction system":
- A structure that is prefabricated or manufactured on site by application of the wet composition of concrete or mortar, onto horizontal surfaces by spreading, onto vertical surfaces by spraying,
- A structure that is prefabricated or manufactured on site by pouring and casting this wet composition in molds or formwork;
- Or unitary construction members for buildings, such as cinder blocks, quarry stone, bricks, concrete blocks, etc., these members being generally standardized and prefabricated and intended for the construction of walls, ceilings, or floors.

"dry composition": a mixture of biosourced powders and aggregates which may contain powdered aggregates of inorganic origin, intended to be mixed with water in order to obtain a hardened insulation after drying and curing.

The powders and in particular the bio-sourced aggregates covered by the term "dry composition" may contain residual amounts of water which do not affect the properties of the "dry composition", for example its flow properties, or the properties of the hardened insulation, for example its durability.

The designation "dry composition" is defined here in contrast to the designation "wet composition" which refers to the composition obtained by mixing the "dry composition" with water.

"stalk" means the stem or stalk of the plant constituting the raw material of the bio-sourced aggregates, this stalk consisting of the skin and a core formed by the pith. The appended FIG. 8 shows a cross-sectional view of a sunflower stalk T in the left photo. The darker peripheral part is the skin (E) and the lighter central part is the pith (M).

"pith" of the "stalk": core of the stalk, having a BD that is less than 60 kg/m$^3$.

"skin" of the "stalk": consisting of everything that is not pith in the stalk, the skin has a BD>110 kg/m$^3$.

"pith particles": non-acicular (roughly spherical) or acicular particles having a BD<60 kg/m$^3$. The photo on the right in FIG. 8 and the left side of the photo of FIG. 9 show particles of sunflower pith. The right side of FIG. 9 shows non-acicular particles of corn pith. FIG. 10B shows acicular particles of rape pith.

"skin particles": acicular particles (rods) having a BD>110 kg/m$^3$. The appended FIG. 8 shows sunflower skin particles in the center photo. The appended FIG. 10A shows rape skin particles.

"stalk particles" comprise skin particles (rods) and pith particles.

The particle "size" of the bio-sourced filler (B) corresponds to the largest of the three dimensions of each particle.

"complete pass-through particle size": 100% of the aggregates are smaller than the sieve.

"mortar" or "concrete" indiscriminately refers to a dry or wet or hardened mixture of one or more organic and/or inorganic binders, fillers of inorganic and/or plant origin, and possibly fillers and/or additives and/or admixtures;

"insulating" mortar: refers to a T grade mortar, "mortar for thermal insulation coating" according to EN 998-1 or a concrete forming a layer for which the thermal conductivity λ, measured after complete drying according to the hot plate method, reference NF EN 12664, is less than or equal to—in W/mK and in increasing order of preference—0.2; 0.15; 0.12; 0.1; 0.08; 0.07;

"complete drying" means stabilization of the mass of the hardened mortar at plus or minus 3%, over 24 hours, for a storage at 50% relative humidity;

A particulate filler has a size less than or equal to X mm if its d90 is less than or equal to X mm; The term "d90" refers in this description to the particle size criterion where 90% of the particles are smaller than "d90". The particle size is measured by sieving according to the EN 12192-1 standard;

"about" or "substantially" means within plus or minus 10%, or even plus or minus 5%, relative to the unit of measurement used;

"polymer" indiscriminately means "homopolymer" and "copolymer" and/or a mixture of polymers;

"between Z1 and Z2" means that one and/or other of the end values Z1, Z2 is or is not included in the interval [Z1, Z2].

DETAILED DESCRIPTION OF THE INVENTION

DESCRIPTION OF FIGURES

The description is made with reference to the appended figures, in which:

FIG. 1 is a longitudinal section diagram of a first embodiment of the construction system (wall) of the invention;

FIG. 2 is a longitudinal section diagram of a second embodiment of the construction system (wall) of the invention;

FIGS. 3A & 3B are longitudinal section diagrams of two variants of a third embodiment of the construction system (wall) of the invention, in renovation;

FIG. 5 is a longitudinal section diagram of a fifth embodiment of the construction system (wall) of the invention, in new construction;

The attached

The attached

The attached

The attached

CONSTRUCTION SYSTEM

Figure 4A:
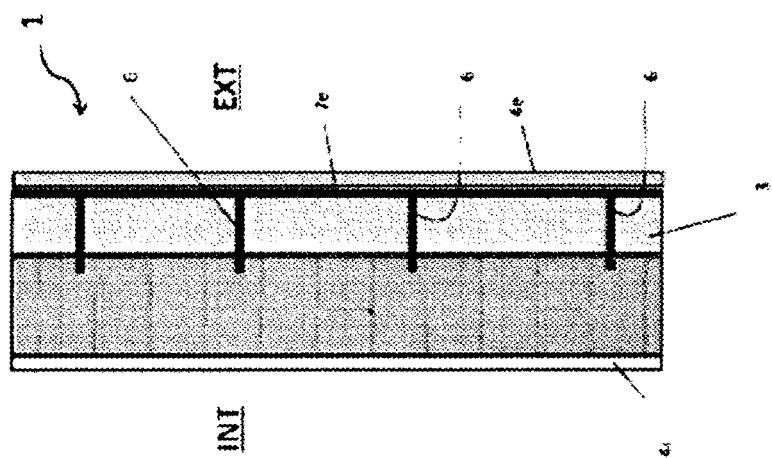
FIGS. 4A, 4B, & 4C are longitudinal section diagrams of three variants of a fourth embodiment of the construction system (wall) of the invention in new construction.
Figure 4B:
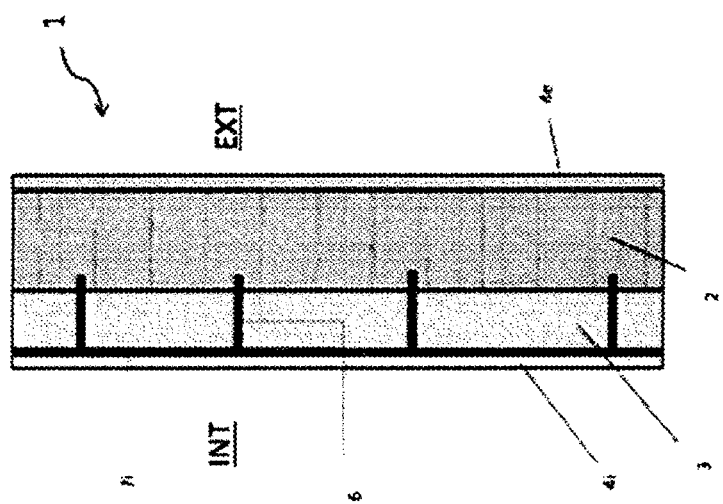
Figure 4C:
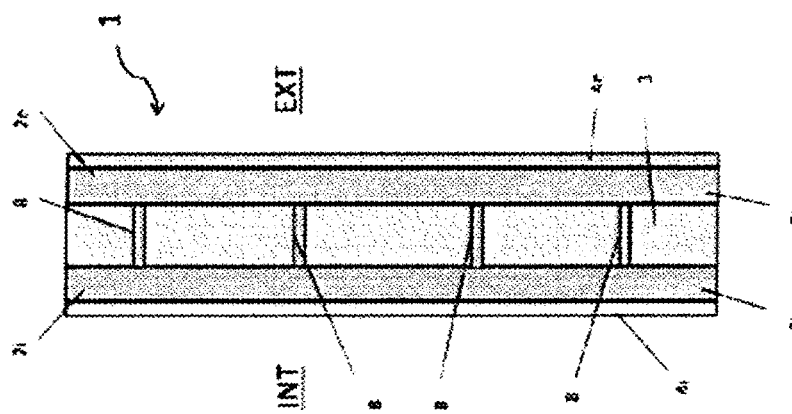

The construction system according to the invention is denoted by the general reference (1) in the accompanying figures. The terms "INT" and "EXT" respectively designate the interior and the exterior of the construction in FIGS. 1, 2, 3A, 3B, 4A, 4B, 4C, & 5. It comprises one or two walls (2, 2i, 2e), which are vertical (for embodiments 1 to 5) load-bearing walls or horizontal surfaces (for embodiments 6 and 7), at least one hardened insulation layer (3), possibly at least one finishing layer (4, 4i, 4e), and possibly at least one additional insulation layer (5).

In embodiments 1 to 5, this wall (2, 2i, 2e) is a wall (possibly load-bearing) made of a building material such as filling concrete, cellular concrete, cob, steel (cladding—panel), cinder blocks, quarry stones, hollow bricks, perforated bricks, solid bricks, heat-insulating bricks, poured concrete, wood (round timber—panel), as well as a combination of these materials.

The wall (2, 2i, 2e) of embodiments 1 to 5 can be manufactured on site, in other words at the construction site of the building, just before construction or as the construction proceeds. According to one variant, members of this wall (2, 2i, 2e), for example panels, may be prefabricated at a dedicated production site. These members are then transported to the work site and are assembled during construction of the building.

In the embodiment of FIG. 1, the hardened insulation layer of mortar (3) can be manufactured by spraying a wet composition consisting of a mixture of the dry composition (d) according to the invention and water. Conventionally, this application is carried out manually by floating, or mechanically with known devices such as a screw pump or piston pump connected to a spray gun. The dry composition (d) and the mixing ratio with water are chosen so that the wet composition adheres and dries on the sprayed face, namely the external face of the wall (2). Drying and hardening then take place. The hardened insulation layer of mortar (3) may also be prefabricated, for example in the form of panels, fixed by any known and appropriate means to the external face of the wall (2), for example by gluing and/or screwing and/or nailing.

As shown in FIG. 1, an outer finishing layer (4e) is applied to the hardened insulation layer of mortar (3), while an inner finishing layer (4i) is placed on the inner face of the load-bearing wall (2). These finishing layers (4i & 4e) may be formed of one or more layers of plaster, and/or one or more layers of paint, plasterboard, panels of plastic (e.g. polycarbonate), of wood, of metal, of stone, of composite, of concrete, of terracotta, of ceramic, of tile, of glass, and combinations thereof.

In the second embodiment shown in FIG. 2, the vertical wall (2) is provided with horizontal framing (20) on its outer face, useful for attaching an outer finishing layer (4e) arranged parallel to the outer face of the wall (2) and together with said layer (4e) defining an interstitial space occupied wholly or in part by the hardened insulation layer (3). In the example shown in FIG. 2, this interstitial space comprises the hardened insulation layer of mortar (3) integrally attached to the outer face of the wall (2), and an air gap (5) also acting as an insulator.

In the third embodiment shown in FIGS. 3A & 3B, a further insulation layer (5) is applied to the outer face of the wall (2). This insulation layer (5) may consist of various insulating materials, in particular based on inorganic insulation (in particular glass wool, rock wool, foam glass, perlite, vermiculite, expanded clay, and mixtures thereof), and/or natural insulation (in particular cork, wood fiber, hemp, flax fiber, sheep wool, duck feathers, coconut fibers, reed boards, cellulose wadding, cotton wool, straw, cob, and mixtures thereof), and/or synthetic insulation (in particular expanded polystyrene, extruded polystyrene, polyurethane, phenolic foam, and mixtures thereof).

The construction system according to the variant of FIG. 3A of this third embodiment further comprises, from internal to external starting with the insulation layer (5), a first external finishing layer ($4e^1$), the hardened insulation layer of mortar (3), then a second external finishing layer ($4e^2$). An internal finishing layer (4i) is applied to the inner face of the load-bearing wall (2).

The construction system according to the variant of FIG. 3B of this third embodiment further comprises, from internal to external starting with the load-bearing wall (2), a first internal finishing layer ($4i^1$), the hardened insulation layer of mortar (3), then a second internal finishing layer ($4i^2$). An external finishing layer (4e) is applied to the outer face of the additional insulation layer (5).

The nature, manufacture, and installation of these layers (3) and (4i, $4e^1$, $4e^2$, $4i^1$, $4i^2$) are of the same type as those described above for the first two exemplary embodiments.

FIG. 4 shows the fourth embodiment, presenting three variants 4A, 4B, 4C, in which:
variant 4A: the wall (2) is connected by its outer face to an external vertical support (7e) by means of horizontal struts (6);
variant 4B: the wall (2) is connected by its inner face to an internal vertical support (7i) by means of horizontal struts (6);

variant 4C: the wall (2) is a hollow supporting structure comprising two panels, internal (2i) and external (2e), connected to each other by horizontal bracing members (8).

The wall (2) and the external (7e) or internal (7i) vertical support, for variants 4A & 4B, as well as the two internal (2i) & external (2e) panels for variant 4C, thus define a formwork within which is located the hardened insulation layer (3) obtained by pouring the wet composition into said formwork and drying.

In variant 4A, an external finishing layer (4e) is applied to the outer face of the external vertical support (7e). In variant 4B, it is an internal finishing layer (4i) that is placed on the inner face of the internal vertical support (7i). And it is an external finishing layer (4e) and an internal finishing layer (4i) which are respectively placed on the inner and outer faces of the internal (2i) & external (2e) panels.

These finishing layers are similar in nature, manufacture, and application to what was described above for the first three exemplary embodiments.

The fifth embodiment of the construction system, shown in FIG. 5, comprises an internal wall 2i and an external wall 2e connected to each other by struts 8, so as to define a formwork occupied by the hardened insulator layer (3), as described above.

In the ceiling (variant 6A) and attic (variant 6B) configurations of the sixth embodiment, the wall (2) of the construction system is a concrete slab cast in place, precast concrete members (slabs, prestressed concrete), hollow core concrete slabs, or a combination of these materials.

For the ceilings in variant 6A, the hardened insulation layer (3) is applied for example by spraying, on the lower face of the wall (2), a wet composition consisting of a mixture of water and the dry composition (d) according to the invention. Conventionally, such application is performed manually by floating, or mechanically with known devices such as a screw pump or piston pump connected to a spray gun. The dry composition (des) and the ratio for mixing with water are chosen so that the wet composition adheres and dries on the application face, namely the external face of the wall (2). Drying and hardening then take place. The hardened insulation layer (3) may also be prefabricated, for example in the form of panels, fixed by any known and appropriate means to the lower face of the wall (2) forming a ceiling member, for example by gluing and/or screwing and/or nailing.

The hardened insulation layer (3) may be covered with a finishing layer (4) which is fixed on a horizontal support (7) secured to the wall (2) by means of vertical struts (6) which traverse the hardened insulation layer (3), which is advantageously separated from the horizontal support (7) by an insulating air gap (5).

Figure 6B:
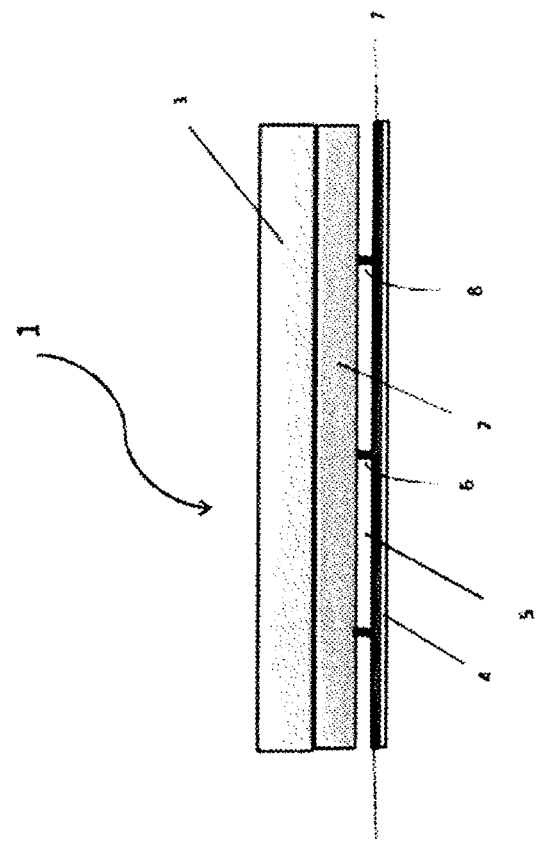
FIGS. 6A & 6B are longitudinal section diagrams of a ceiling insulation variant (6A) and an attic insulation variant (6B), in a sixth embodiment of the construction system of the invention, in new construction or in renovation.
Figure 6A:
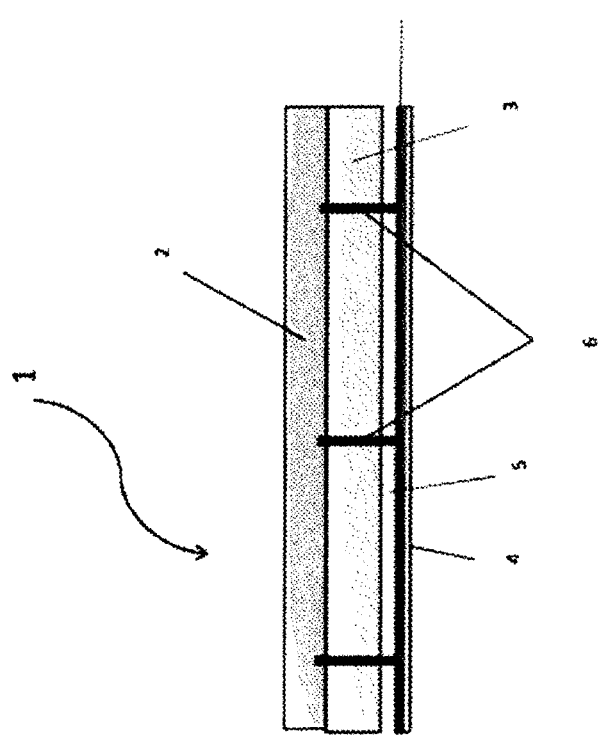
Figure 7:
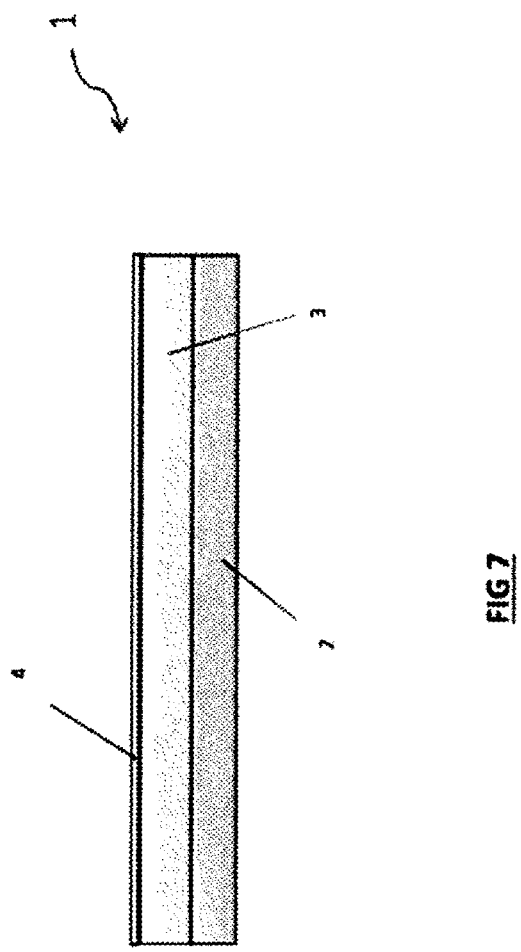
FIG. 7 is a longitudinal section diagram of a seventh embodiment of the construction system (floor-screed) of the invention, in new construction or in renovation.

For the attics of variant 6B, the hardened insulation layer (3) is applied, for example by pouring, between the roof (not shown in FIG. 6B) and the upper face of the wall (2), a wet composition consisting of a mixture of the dry composition (d) according to the invention and water. The hardened insulation layer (3) may also be prefabricated, for example in the form of panels, fixed by any known and appropriate means between the roof and the upper face of the wall (2).

The lower face of the wall (2) may be covered with a finishing layer (4) which is fixed to a support (7) secured parallel to this wall (2) by means of struts (6) which define an insulating air gap (5) between the wall (2) and the support (7).

The nature, manufacture, and installation of these layers (3) & (4) are of the same type as described above for the first five exemplary embodiments.

The seventh embodiment is a construction system (1) intended for forming the floor of a building. In this embodiment, the wall (2) is a floor made of a building material such as a concrete slab, a wood floor, a cement or anhydrite screed, or a combination of these materials.

The upper face of this wall (2) is integral with the hardened insulation layer (3), which is for example a light screed or a mortar bed screed. The latter is advantageously covered with a finishing layer (4). The nature, manufacture, and installation of these layers (3) & (4) are of the same type as described above for the first six exemplary embodiments.

For floors, the hardened insulation layer (3) may be manufactured by spraying or pouring a wet composition consisting of a mixture of the dry composition (d) according to the invention and water. Conventionally, this application is carried out manually by floating, or mechanically with known devices such as a screw pump or piston pump connected to a spray gun. The dry composition (des) and the ratio for mixing with water are chosen so that the wet composition flows and can be spread properly over the floor. Drying and hardening then take place. The hardened insulation layer (3) may also be prefabricated, for example in the form of panels, fixed by any known and appropriate means on the external face of the wall (2), for example by gluing and/or screwing and/or nailing.

Hardened Insulation Layer

According to a noteworthy characteristic of the invention, the hardened insulation layer has a thermal conductivity $\lambda$ that is less than 0.09 W/mK; preferably less than or equal to 0.085 W/mK.

This hardened insulation layer is obtained from a dry composition (d) comprising at least one binder -A-, and at least one bio-sourced aggregate -B-.

Binder -A-

The binder -A- according to the invention ideally comprises at least one hydraulic or air binder -A1-, possibly at least one water retention agent -A2-, and possibly at least one surfactant -A3-.

-A1- Hydraulic or Air Binder

The binder -A1- is preferably selected from the group comprising—ideally composed of—cements, air lime, hydraulic lime, slags, geopolymers, rnetakaolins, binders with a high content of cementitious phases rich in alumina, natural pozzolans, sodium silicates, potassium silicates, lithium silicates, organic binders, and mixtures thereof used alone or in combination;

the cements being advantageously selected from the group consisting of—ideally composed of—Portland cements, fly ash Portland cements, pozzolanic Portland cements, pyrogenic silica Portland cements, masonry cements, quick-setting natural cements, expanding cements, mixed white cements, colored cements, finely ground cements, lime-pozzolana cements, supersulfated cements, calcium sulfoaluminate (CSA) cements, calcium aluminate cements (CAC), natural cements, lime, and mixtures thereof used alone or in combination.

Alternatively, the cements are selected from the following types: calcium aluminate cements (CAC), calcium sulfoaluminate (CSA) cements, binders with a high content of cementitious phases rich in alumina, or mixtures thereof used alone or in combination.

According to another variant, the cements are selected from the following types: quick-setting cements (for example quick-setting natural cements), geopolymer cements, slags, calcium aluminate cements (CAC), calcium sulfoaluminate (CSA) cements, or mixtures of these types used alone or in combination.

The lime may be an air and/or hydraulic lime.

The air lime concerned is of the type complying with the NF EN 459-1 standard, preferably chosen from the group comprising—ideally consisting of—:

an air calcitic lime (CL) containing calcium oxide (CaO) and/or calcium hydroxide (Ca(OH)2) for which the sum of CaO+MgO is at least 70% and the MgO content <5%;

dolomitic lime (DL) containing calcium magnesium oxide (CaO MgO) and/or calcium magnesium hydroxide (Ca(OH)2Mg(OH)2) for which the sum of CaO+MgO is at least 80% and the MgO content varies from 5% to more than 30%.

or their mixtures.

The air lime used can be in various forms such as a paste, a powder, or, for quicklime, the rock itself.

The hydraulic lime concerned is of the type complying with the NF EN 459-1 standard. Any lime mixture of any type, in any form whatsoever, can contain the composition of the invention.

According to one variant, the binder -A1- may be chosen from binders with a high content of cementitious phases rich in alumina or mixtures of these cements or of these binders used alone or in combination. These may be, for example, quick-setting cements, calcium aluminate cements (CAC), calcium sulfoaluminate (CSA) cements, or even more preferably may be chosen from hydraulic binders comprising:

at least one phase chosen from $C_3A$, $CA$, $C_{12}A_7$, $C_{11}A_7CaF_2$, $C_4A_3\$$ (ye'elimite), $C_2A_{(1-x)}F_x$ (where C→CaO; A→Al$_2$O$_3$; F→Fe2O3 and x is a member of [0, 1]), amorphous hydraulic phases having a mole ratio C/A of between 0.3 and 15, and such that the cumulative concentrations of $Al_2O_3$ in these phases are between:
3 and 70% by weight of the total of the hydraulic binder,
preferably between 7 and 50% by weight,
and more preferably between 20 and 30% by weight.

CACs are cements comprising a mineralogical phase C4A3$, CA, C12A7, C3A, or C11A7CaF2, or mixtures thereof, for example such as Ciments Fondue®, sulfoaluminate cements, calcium aluminate cements according to the European standard NF EN 14647 of December 2006, cement obtained from clinker as described in patent application WO2006/018569, or mixtures thereof.

Sulfoaluminate clinkers are obtained from a mixture of calcium carbonate in limestone form, bauxite, or another source of alumina (for example dross by-product), and calcium sulfate, which is either gypsum, anhydrite, or hemihydrate, or mixtures thereof. The specific component at the end of the manufacturing process is ye'elimite, C4A3$. In particular, it is possible to use quick-setting cements or sulfoaluminate cements having a ye'elimite content of between 3% and 70%, which may be available from Vicat, Italcementi, Lafarge-Holcim, Polar Bear, Liu Jiu, Readerfast.

For example, a quick-setting natural cement is composed of a clinker containing
from 0% to 35% C3S;
from 10% to 60% C2S;
from 1% to 12% C4AF;
from 1% to 10% C3A;
from 5% to 50% CaCO3 (calcite);
from 10% to 15% Ca5 (SiO4) 2CO3 (spurrite);
from 3 to 10% sulfate phases: ye'elimite (C4A 3$), Langbeinite (K 2Mg 2(SO 4) 3, anhydrite (C$), and
from 10 to 20% lime, periclase, quartz, and/or one or more amorphous phases.

According to one variant, the binder -A1- may be chosen from binders comprising a source of calcium sulfate, preferably chosen from anhydrites, gypsums, calcium hemihydrates, supersulfated cements, and mixtures thereof.

-A2- Water Retention Agent

Preferably, the water retention agent -A2- has a water retention greater than or equal to—by increasing order of preference—50, 60, 70, 80, 90%, according to retention measurement method M2, the water retention agent preferably being selected from the polysaccharides, and more preferably from the group comprising—or more preferably consisting of—ethers of cellulose or starch and mixtures thereof; hydroxyethyl celluloses, hydroxypropyl celluloses, hydroxypropyl methylcelluloses, hydroxyethyl methylcelluloses, and mixtures thereof; modified or unmodified guar ethers and mixtures thereof; or a mixture of these different types.

The water retention agent A2 preferably has a viscosity of 2% in water, measured with the HAAKE Rotovisco RV100 rheometer, shear rate of 2.55 s$^{-1}$ at 20° C. between 5,000 and 70,000 cP, preferably between 20,000 and 50,000.

The water retention agent A2 has the property of retaining the mixing water before setting. The water is thus held in the mortar or concrete paste, which gives it very good adhesion and good hydration. To a certain extent, it is less absorbed on the substrate; release at the surface is limited and there is thus little evaporation.

-A3- Surfactant

The surfactants are preferably chosen from:
i. sources of anionic surfactants such as alkyl sulfates, alkyl ether sulfates, alkaryl sulfonates, alkyl succinates, alkyl sulfosuccinates, alkyl sarcosinates, alkyl phosphates, alkyl ether phosphates, alkyl ether carboxylates, and alpha olefin sulfonates, preferably sodium lauryl sulfate,
ii. nonionic surfactants such as fatty alcohol ethoxylates, mono or di alkyl alkanolamides, alkyl polyglucosides,
iii. amphoteric surfactants such as alkyl amine oxides, alkyl betaines, alkyl amidopropyl betaines, alkyl sulfobetaines, alkyl glycinates, alkyl amphopropionates, alkyl amidopropyl hydroxysultaines.
iv. polyether polyols, hydrocarbon molecules, silicone molecules, hydrophobic esters,
v. nonionic surfactants,
vi. polyoxiranes,
vii. or their mixtures;

As ionic surfactants, one can list the following non-limiting examples: alkyl ether sulfonates, hydroxyalkyl ether sulfonates, alpha olefin sulfonates, alkyl benzene sulfonates, alkyl ester sulfonates, alkyl ether sulfates, hydroxyalkyl ether sulfates, alpha olefin sulfates, alkyl benzene sulfates, alkyl amide sulfates, and their alkoxylated derivatives (particularly ethoxylated (OE) and/or propoxylated (OP)), the corresponding salts, or mixtures thereof. As ionic surfactants, one can also list the following non-limiting examples: saturated or unsaturated fatty acid salts and/or their alkoxylated derivatives, particularly (OE) and/or (OP) (for example sodium laurate, sodium palmitate or sodium stearate, sodium oleate), methyl and/or sodium alpha sulfonated laurates, alkylglycerol sulfonates, sulfonated polycarboxylic acids, paraffin sulfonates, N-acyl N-alkyl taurates, alkyl phosphates, alkyl succinamates, alkyl sulfosuccinates, sulfosuccinate monoesters or diesters, alkyl glucoside sulfates.

As nonionic surfactants, one can list the following non-limiting examples: fatty alcohol ethoxylates, alkoxylated alkyl phenols (particularly (OE) and/or (OP)), aliphatic alcohols particularly in 08-022, products resulting from the condensation of ethylene oxide or propylene oxide with propylene glycol or ethylene glycol, products resulting from the condensation of ethylene oxide or propylene oxide with ethylenediamine, the amides of alkoxylated fatty acids (particularly (OE) and/or (OP)), alkoxylated amines (particularly (OE) and/or (OP)), alkoxylated amidoamines (particularly (OE) and/or (OP)), amine oxides, alkoxylated terpene hydrocarbons [particularly (OE) and/or (OP)], alkyl polyglucosides, amphiphilic polymers or oligomers, ethoxylated alcohols, sorbitan esters or ethoxylated sorbitan esters.

As amphoteric surfactants, one can list the following as non-limiting examples: betaines, imidazoline derivatives, polypeptides, or lipoamino acids. More particularly, betaines that are suitable according to the invention may be chosen from cocamidopropyl betaine, dodecyl betaine, hexadecyl betaine, octadecyl betaine, phospholipids and their derivatives, amino acid esters, water-soluble proteins, water-soluble protein esters, and mixtures thereof. As cationic surfactants, one can also list the following as non-limiting examples: laurate amino oxide, propyl cocoate amino oxide, caprylamphocarboxy glycinate, lauryl propionate, lauryl betaine, the tall oil bis 2-hydroxyethyl betaine. According to one particular embodiment of the invention, the nonionic foaming agent may be associated with at least one anionic or cationic or amphoteric foaming agent.

As amphiphilic surfactants, one can list the following non-limiting examples: polymers, oligomers, or copolymers which are at least miscible in the aqueous phase. The amphiphilic polymers or oligomers may have a statistical distribution or a multiblock distribution. Amphiphilic polymers or oligomers used according to the invention are chosen from block polymers comprising at least one hydrophilic block and at least one hydrophobic block, the hydrophilic block being obtained from at least one nonionic and/or anionic monomer. As examples of such amphiphilic polymers or oligomers, we can list in particular the polysaccharides having hydrophobic groups, in particular alkyl groups, polyethylene glycol and its derivatives. As examples of amphiphilic polymers or oligomers, we can also list polyhydroxystearate-polyethylene glycol-polyhydroxystearate triblock copolymers, branched or unbranched acrylic polymers, or hydrophobic polyacrylamide polymers.

As for nonionic amphiphilic polymers, particularly alkoxylated (in particular (OE) and/or (OP)), these are more particularly chosen from polymers of which at least a part (at least 50% by mass) is water-miscible. As examples of polymers of this type, we can list polyethylene glycol/polypropylene glycol/polyethylene glycol triblock copolymers. Preferably, the foaming agent used according to the invention is a protein, in particular a protein of animal origin, more particularly keratin, or a protein of plant origin, more particularly a water-soluble protein of wheat, rice, soy, or grains. As examples we can list sodium laurate from wheat protein hydrolyzate, laurate from oat protein hydrolyzate, or sodium cocoate from apple amino acids. Preferably, the foaming agent used according to the invention is a protein having a molecular mass between 300 and 50,000 Daltons. The foaming agent is used according to the invention at a concentration of 0.001 to 2%, preferably from 0.01 to 1%, more preferably from 0.005 to 0.2 by mass of foaming agent relative to the mass of the binder.

- A4- Additional Binder

In a preferred embodiment of the invention, the composition comprises at least one additional binder -A4-, different from binder -A1-, and selected from Portland cements, slags, geopolymer cements, natural pozzolans, sodium silicates, potassium silicates, lithium silicates, organic binders, or mixtures thereof.

For example, an artificial Portland cement suitable as a secondary binder A4 comprises
  20% to 95% of a clinker containing:
    50% to 80% C 3S;
    4% to 40% C 2S;
    0% to 20% C 4AF; and
    0% to 2% C 3A;
  0% to 4% of $;
  0% to 80% blast furnace slag, silica fume, pozzolans, and/or fly ash.

Alternatively, A4 is an organic binder selected from the group comprising—ideally consisting of—: redispersible polymer powders, epoxy (co)polymers, (co)polyurethanes, and mixtures thereof.

According to a noteworthy feature of the invention, the composition further comprises:
  -A5- an inorganic lubricating filler having a particle size d90 that is less than 100 μm;
  -A6- an inorganic spacer filler having a particle size d90 that is greater than or equal to 100 μm;
  and possibly one or more admixtures.

-A5- Inorganic Lubricating Filler:

The inorganic lubricating filler having a particle size d90 that is less than 100 μm is preferably chosen
  from natural and synthetic silicate minerals, and more preferably from clays, micas, kaolins and metakaolins, silica fumes, fly ash, and mixtures thereof,
  from limestone or silico-limestone
  from fly ash,
  or from mixtures thereof.

-A6- Inorganic Spacer Filler:

The inorganic spacer filler having a particle size d90 of greater than or equal to 100 μm is preferably chosen from the siliceous, calcareous, or silica-calcareous sands, lightweight fillers, which are more particularly chosen from expanded or unexpanded vermiculite, expanded or unexpanded perlite, expanded or unexpanded glass beads (hollow glass beads (type 3M®) or expanded glass granules (Poraver®, Liaver®), silica aerogels, expanded or unexpanded polystyrene, cenospheres (litefil), hollow alumina balls, expanded or unexpanded clays, pumices, silicate foam grains, rhyolite (Noblite®), or mixtures thereof.

-A7- Water Repellent Admixture:

The water repellent is preferably chosen from the group comprising, or more preferably consisting of, fluorinated, silanized, siliconated, siloxanated agents, metal salts of fatty acids, and mixtures thereof, preferably chosen from sodium, potassium, and/or magnesium salts of oleic and/or stearic acids, and mixtures thereof.

-A8- Set Retardant Admixture:

The set retardant is preferably chosen from the group comprising, or more preferably consisting of, calcium chelating agents, carboxylic acids and their salts, polysaccharides and their derivatives, phosphonates, lignosulfonates, phosphates, borates, as well as the lead, zinc, copper, arsenic, and antimony salts, and more particularly is chosen from tartaric acid and its salts, preferably its sodium or potassium salts, citric acid and its salts, preferably its sodium salt (trisodium citrate), sodium gluconates, sodium phosphonates, sulfates and their sodium or potassium salts, and mixtures thereof.

-A9- Set Accelerator Admixture:

The set accelerator is preferably chosen from the group comprising, or more preferably consisting of, the alkaline and alkaline-earth salts of hydroxides, of halides, of nitrates, of nitrites, of carbonates, of thiocyanates, of sulfates, of thiosulphates, of perchlorates, of silica, of aluminum, and/or chosen from carboxylic and hydrocarboxylic acids and their salts, alkanolamines, silicated insoluble compounds such as silica fumes, fly ash, or natural pozzolans, silicated quaternary ammoniums, finely divided inorganic compounds such as finely divided silica gels or calcium and/or magnesium carbonates, and mixtures thereof; this complementary set accelerator (e) preferably being chosen from the group comprising or more preferably consisting of chlorides and their sodium or calcium salts, carbonates and their sodium or lithium salts, sulfates and their sodium or potassium salts, calcium hydroxides and formates, and mixtures thereof.

-A10- Thickening Admixture:

A10 is an admixture that is different than A2 and makes it possible to improve the yield point of the mortar (mortar hold on substrate).

Preferably, this thickening admixture is chosen from the group comprising or more preferably consisting of polysaccharides and their derivatives, polyvinyl alcohols, mineral thickeners, linear polyacrylamides, and mixtures thereof.

-Binder A Compositions:

In one embodiment, the composition according to the invention is characterized in that binder A comprises—as % weight/weight on a dry basis and in increasing order of preference:
- -A1- primary binder: [5-95]; [10-85]; [15-75];
- -A2- water retention agent: [0.1-5]; [0.5-3]; [0.8-2];
- -A3- surfactant: [0-2]; [0.01-1]; [0.05-0.5];
- -A4- additional binder [0-85]; [5-50]; [7-15];
- -A5- inorganic lubricating filler having a particle size d90 that is less than 100 μm: [0-40]; [0-30]; [0-20];
- -A6- inorganic spacer filler having a particle size d90 that is greater than or equal to 100 μm: [0-40]; [0-35]; [0-30];
- -A7- water repellent admixture: [0-1.5]; [0-1]; [0-0.5];
- -A8- set retardant admixture: [0-3]; [0-2]; [0-1];
- -A9- set accelerator admixture: [0-3]; [0-2]; [0-1];
- -A10- thickening admixture: [0-2]; [0.1-1]; [0.2-0.8].

-B- Bio-Sourced Aggregate

This bio-sourced aggregate, typical of construction systems according to the invention, is based on sunflower stalks and/or corn stalks and/or rape stalks and has a BD of less than 110 kg/m³.

More specifically, this bio-sourced aggregate is based on stalk pith which represents more than 15% of the weight of the aggregate on a dry basis.

This quantitative and qualitative selection of the bio-sourced aggregate ensures that a construction system according to the invention will be obtained in which the hardened insulation layer provides the desired heat insulation properties while giving the construction system its mechanical properties, and in particular the expected ductility.

According to a preferred feature of the invention, the bio-sourced aggregate consists of stalk particles which have a complete pass-through particle size in the largest dimension of said particles (in mm and in increasing order of preference) ≤15; ≤14; ≤13; ≤12; ≤11.

These particles are produced from sunflower stalks, corn stalks, and/or rape stalks, by industrial methods of shredding, crushing, grinding, separation.

The separation of stalk particles may consist in particular of sorting between the pith particles and the skin particles, for example using a gravity table.

According to a preferred feature of the invention, the stalk particles mainly consist of pith particles. More preferably, the percentage $P^{pith}$ by weight on a dry basis of pith particles relative to the total mass of the stalk particles is defined as follows, in increasing order of preference: $P^{pith}$>15; ≥20; ≥30; ≥40; ≥50.

Unlike the skin, the pith of sunflowers is characterized by a highly alveolar structure which gives it a very low density (30-35 kg/m³).

To optimize the performance of the construction system, the invention provides that this pith is in the form of particles having a form factor F, defined as the ratio of the largest dimension of the particles to the smallest dimension, such that F≤3; preferably F≤2.5.

Intermediate Products

Another object of the invention concerns the dry composition (d) as a novel product, useful in particular in the system according to the invention, characterized in that it contains at least one bio-sourced aggregate B based on sunflower stalks and/or corn stalks and/or rape stalks having a Bulk Density (BD) in kg/m³ that is less than 110; preferably between 10 and 80.

In this dry composition (d), the pith is advantageously in the form of particles having a form factor F, defined as the ratio of the largest dimension of the particles to the smallest dimension, such that F≤3; preferably F≤2.5; and more preferably F≤2.5.

Preferably, the dry composition (d) according to the invention contains a binder A comprising as % weight/weight on a dry basis and in increasing order of preference:
- -A1- binder: [5-95]; [10-85]; [15-75];
- -A2- water retention agent: [0.1-5]; [0.5-3]; [0.8-2];
- -A3- surfactant: [0-2]; [0.01-1]; [0.05-0.5];
- -A4- additional binder [0-85]; [5-50]; [7-15];
- -A5- inorganic lubricating filler having a particle size d90 that is less than 100 μm: [0-40]; [0-30]; [0-20];
- -A6- inorganic spacer filler having a particle size d90 that is greater than or equal to 100 μm: [0-40]; [0-35]; [0-30];
- -A7- water repellent admixture: [0-1.5]; [0-1]; [0-0.5];
- -A8- set retardant admixture: [0-3]; [0-2]; [0-1];
- -A9- set accelerator admixture: [0-3]; [0-2]; [0-1];
- -A10- thickening admixture: [0-2]; [0.1-1]; [0.2-0.8].

According to one particular embodiment, the dry composition (d) according to the invention is packaged in a bag comprising bio-sourced aggregate B as defined above, or a binder A as defined above, or a mixture of the two, preferably in proportions suitable for the preparation of a hardened insulation layer, said bag also comprising instructions for use in the manufacture of hardened insulation layers.

The invention also concerns a kit as a novel product, separately comprising packaging containing a bio-sourced aggregate B according to the invention and packaging containing a binder A according to the invention, as well as instructions for using the kit to manufacture hardened insulation layers.

Wet Composition

According to another of its aspects, the invention relates to a wet construction composition formed by a mixture of the dry composition according to the invention, mixed with a liquid, preferably water.

According to a noteworthy feature of the invention, this wet composition is pumpable in a piston pump or screw pump, for example a screw pump with an air gap between rotor and stator of between 4 and 30 mm.

In addition to the pumpability of this wet composition, the composition according to the invention satisfies a "sprayability" specification, meaning for example that said wet formulation, as soon as it is sprayed and applied in a layer of about 5 cm on a vertical support of concrete blocks, holds to this vertical support without creep or flow, during the time required for it to harden and adhere in hardened form to said vertical support, at an ambient temperature for example comprised between 5° C. and 35° C. and a relative humidity RH comprised between 20 and 90 percent.

Method for Preparing this Wet Composition

The present invention also relates to a method for preparing the wet composition as defined above. This method consists of mixing a liquid, preferably water, with the dry construction composition as defined above, advantageously in a mass ratio [water/binder -A-] that is greater than or equal to 0.8, preferably greater than 1, preferably greater than 1.5.

This mixing can be done by any suitable conventional device known to those skilled in the art.

It may be a planetary or fixed-axis (vertical or horizontal) mixer, or a concrete mixer. The mixing device may or may not be installed directly on the machine comprising the screw pump and enabling spray application or casting of the wet composition.

Method for Manufacturing the Construction System

The present invention also relates to a method for manufacturing the construction system according to the invention, essentially:

(i) mixing the binder A, the bio-sourced aggregate B, and the water, the water and the aggregate B preferably being premixed, the binder A then being incorporated into the premix so obtained in order to obtain a wet hardenable composition; preferably in a mass ratio of water to binder A comprised between 0.8 and 5, preferably between 1 and 4, and more preferably between 1.5 and 3.5;

(ii) shaping the wet composition to obtain a layer;

(iii) allowing this layer to dry in order to obtain a hardened insulation layer.

Preferably, the shaping (ii) is carried out by spraying the wet composition onto a substrate formed by a wall of the construction system and/or by pouring into a mold possibly formed by one or more component members of the construction system, this member or at least one of these members being the wall associated with the hardened insulation layer of the construction system.

As shown in the accompanying figures, this wall may be a vertical wall, a ceiling member, or a floor member (screed).

The shaping (ii) is achieved
by spraying the wet composition:
on a vertical or inclined substrate,
to fill a wood or metal framework structure on site,
or to create prefabricated building members;
or
by pouring or spraying and spreading the wet composition
on a horizontal plane on the floor to create a screed or
by spraying the wet composition on a raised horizontal plane to create a ceiling;
or
by pouring the wet composition into a formwork to create a wall, to fill between two walls with wet composition, or pouring into a mold to create prefabricated unitary masonry members, in particular blocks, cinder blocks, bricks, or precast wall elements or panels.

Building Structures or Civil Engineering Works

The invention also relates to building structures constructed using the construction system according to the invention.

Other advantageous details and features of the invention will be apparent from the following description of some exemplary embodiments of the invention.

EXAMPLES

Method M1 for Determining the Bulk Density of the Bio-Sourced Aggregate:

The bulk density is the density of the material in bulk, including the permeable and impermeable voids of the particle as well as the voids between particles.

The protocol for determining the bulk density of aggregates has been defined by the RILEM Technical Committee 236—Bio-aggregates based building materials. This protocol will be called the "reverse method".

It consists of:
Drying the aggregates in an oven at 60° C. until the mass stabilizes.
Introducing the dry aggregates into a cylinder (having a diameter between 10 and 20 cm and a height at least twice the diameter) so that it is at least half full. For example, diameter=12 cm and height=20 cm.
Inverting the container 10 times.
Shaking to obtain a horizontal surface and noting the volume occupied by the aggregates.
Then weighing the aggregates and determining the BD.
The test is repeated 3 times. The average value and the standard deviation of the measurement are calculated.

Method M2 of Measuring the Water Retention Time of a Bio-Sourced Mortar

This method M2 corresponds to an adaptation of the so-called filter method.

Materials:
Metal mold.
Internal dimensions:
Top diameter: 100+5 mm.
Bottom diameter: 80+/−5 mm.
Height: 25+1 mm.
External dimensions:
Diameter: 120+/−5 mm.
Height: 30+1 mm.
Spatula
Earthenware tile (size: about 120 mm×5 mm)
Precision balance 0.01 g
100 mm diameter filter paper (Schleicher or Lab-filter 0965 NW 25 L): separation filter
100 mm diameter filter paper (Schleicher 2294 or Lab-filter S-Type 600)

Protocol:
1. Prepare the sample according to the mixing procedure described for test T2.
2. Weigh the dry and empty mold ➔ $m_A$
3. Weigh the Schleicher 2294 or Lab-filter S-Type 600 filter paper ➔ $m_B$
4. Fill the mold with hemp mortar using a spatula, slightly overfilling to ensure contact between filter and paste.
5. Weigh the filled mold ➔ $m_C$ 6. Cover the paste with the separation filter paper (Schleicher or Lab-filter 0965 NW 25 L) and then place the 2294 or S-600 filter on the whole
7. Place the earthenware tile on the whole and turn it all over, start the stopwatch; the test time is 15 minutes,
8. After 15 minutes, collect the 2294 or S-600 filter paper and weigh it ➔ $m_D$ Expression of Results:

Calculation 1: mass of water contained in the product $M\text{water} = ((m_C - m_A) * Tg \%)/(100 + Tg \%)$ Calculation 2: water loss from the product $\Delta\text{water} = (m_D - m_B)$ Calculation 3: Water retention as a %

$R \% = ((M\text{water} - \Delta\text{water})/M\text{water}) * 100$

EN 1015-8: Methods of Test for Mortar Masonry—Part 8: Determination of Water Retentivity of Fresh Mortar. (September 1999)

Measuring the Thermal Conductivity Lambda Value

The thermal conductivity (w/mK) characterizes the heat flow through a material that is one meter thick, for a temperature difference of one Kelvin between the incoming and outgoing faces.

Measurements were made using a HFM (Heat Flow Meter) and the hot plate method, with 14 cm×16 cm×4 cm prismatic specimens. The measurement conditions were fixed at 20° C. and 50% RH.

Raw Materials
Binder A
A1:
HYDRAULIC LIME HL 3.5 LAFARGE.
HYDRATED LIME CL90, EUROCHO
SULFOALUMINATE CEMENT, I.TECH ALICEM, ITALCEMENTI;
A2:
CULMINAL C8367, WATER RETENTION AGENT, HYDROXYETHYL METHYLCELLULOSE, VISCOSITY 32000-40000 MPA·S, ASHLAND AQUALON;
A3:
NANSA LSS 495/H, SURFACTANT, SODIUM ALPHA OLEFIN SULFONATE, HUNTSMAN;
A5:
SILICA FUME, RW SILICIUM GMBH;
A6:
SILICON SAND, DU 0.1/0.4, SIBELCO FRANCE
A7:
MAGNESIUM STEARATE M125, METALEST.

Bio-Sourced Aggregate -B-:

Filler formed by 95% plant pith obtained by grinding sunflower stalks then sorted using gravity tables (sieve) and vibrating screen. The size of the particles is between 2 mm and 15 mm.

Figure 8:
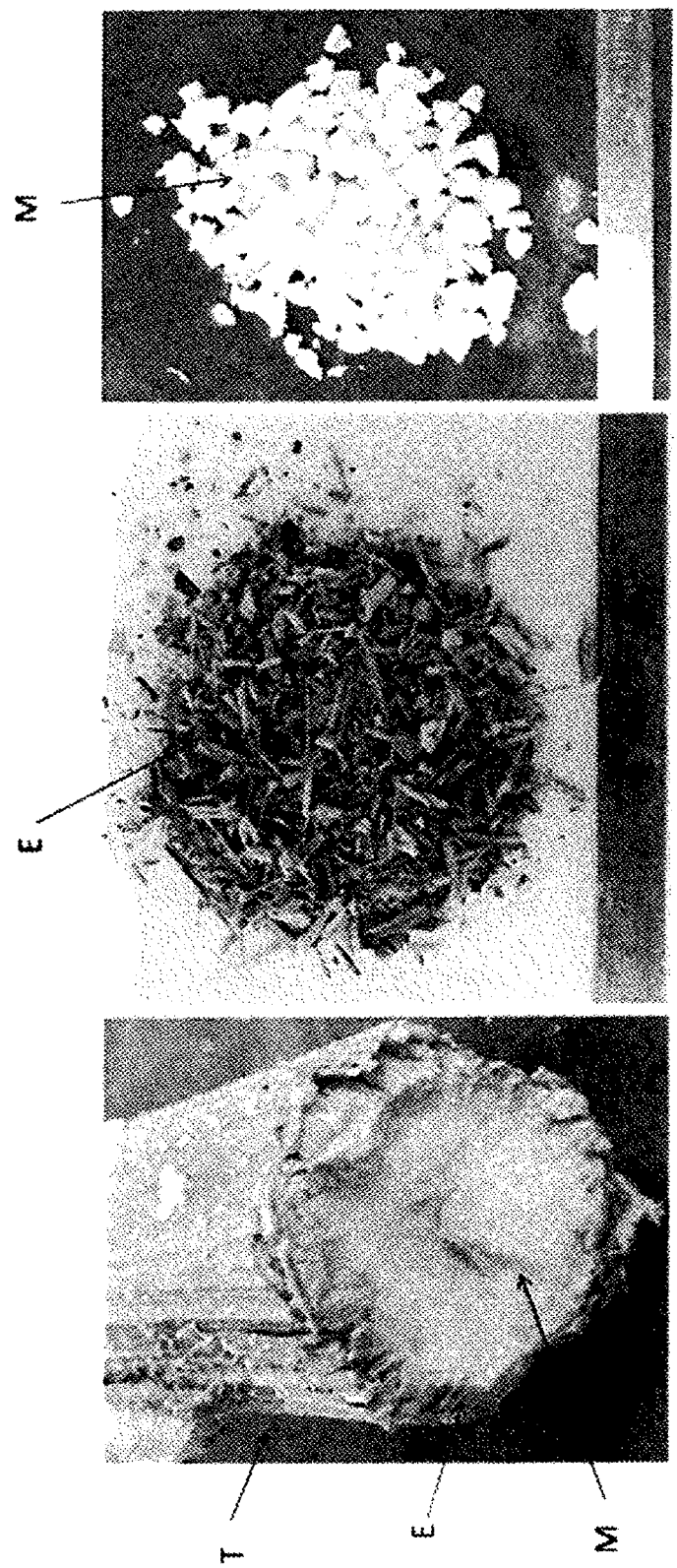
FIG. 8 shows a sunflower stalk T in a cross-sectional view in the left photo, sunflower skin particles in the center photo, and sunflower pith particles in the right photo.

The photographs in the attached FIG. 8 show a sunflower stalk before grinding (left photo), and after grinding and separation: sunflower skin (center photo) and pith (right photo).

Figure 9:
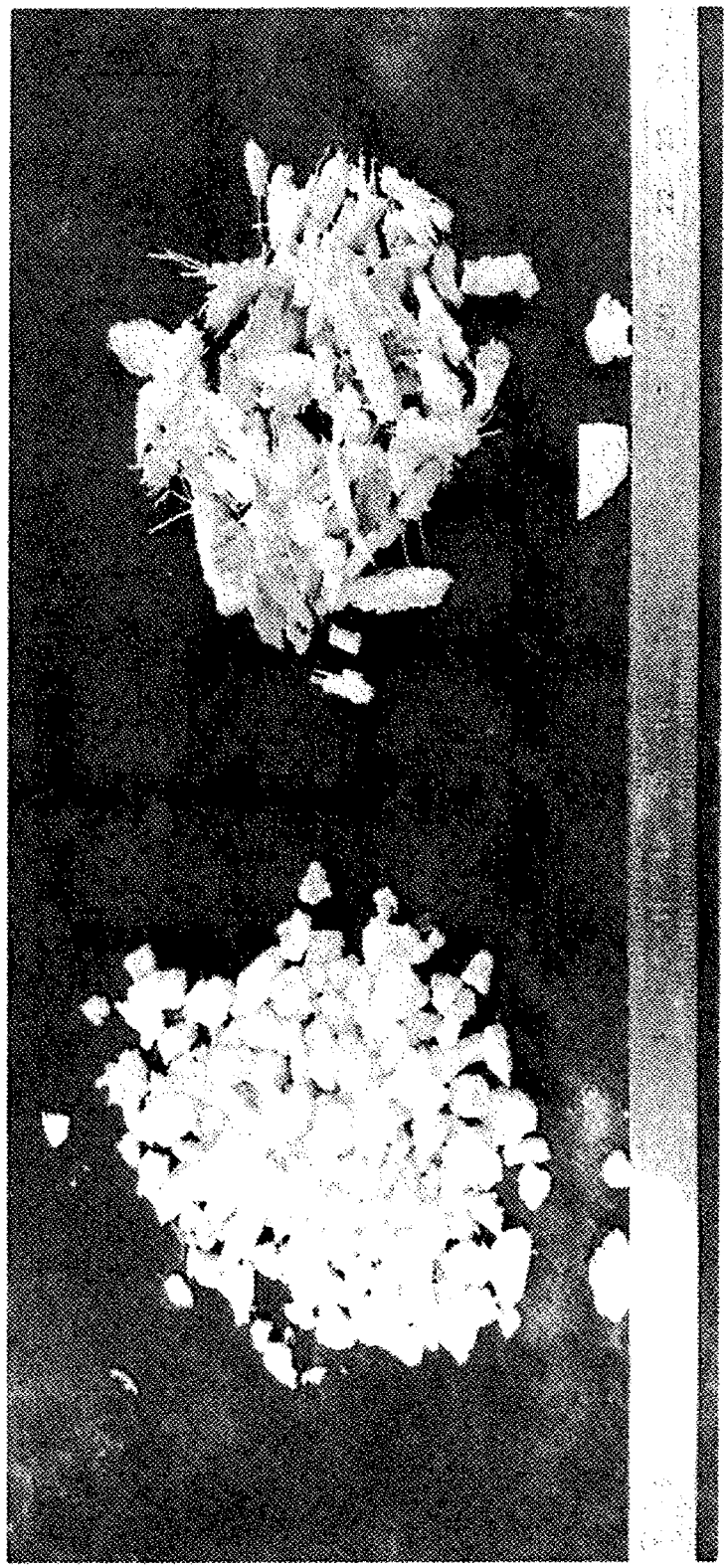
FIG. 9 shows sunflower pith particles on the right and corn pith particles on the left.
Figure 10B:
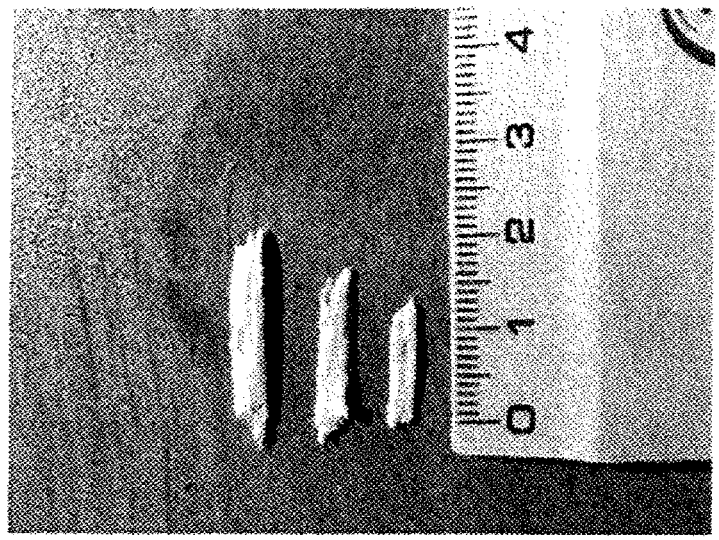
FIG. 10B shows rape pith particles.
Figure 10A:
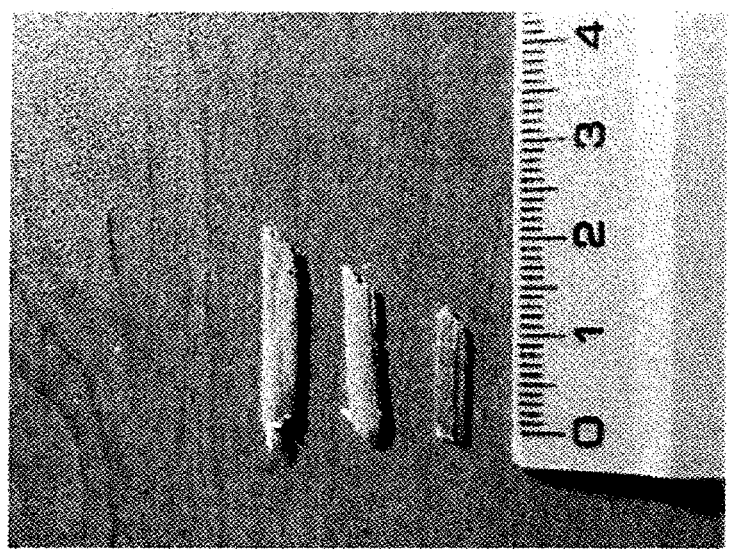
FIG. 10A shows rape skin particles.

The photographs in the attached FIG. 9 show sunflower particles after grinding and separation: pith (left photo) and skin (right photo).

Example 1

Creation of External Thermal Insulation with a Sprayed Insulating Mortar Based on Sunflower Pith.

The insulating system is the one shown in FIG. 1. It is composed of:

(3) a sprayed insulating mortar based on sunflower pith (6 cm), (4) a finishing plaster: PAREXAL lime plaster from PAREXLANKO's PATRIOINE line.

Figure 11C:
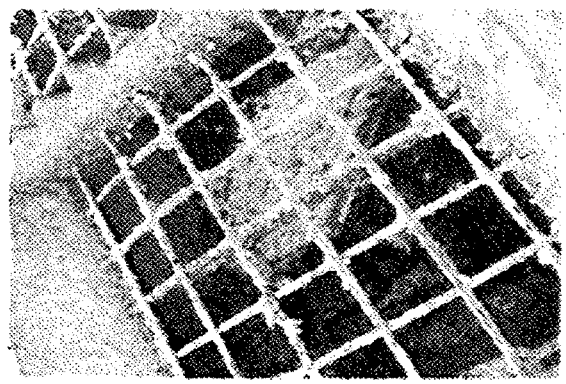
FIGS. 11B & 11C show the mixing of binder A, aggregate B, and water in Example 1.
Figure 11B:
Figure 11A:
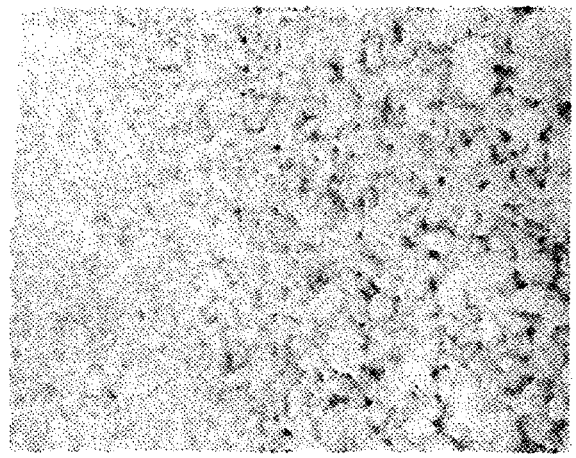
FIG. 11A shows the sunflower pith (aggregate B) of Example 1.

FIGS. 11A 11B & 11C illustrate the mixing of the components of the insulating mortar in the mixing tank of the spraying machine (Putzmeister—P11): pith (aggregate B)+binder A+water.

Figure 12C:
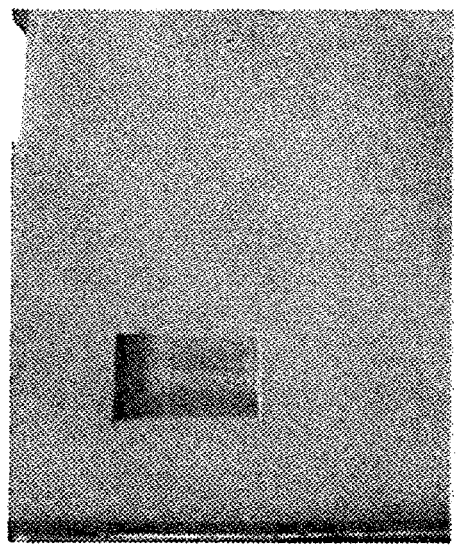
FIGS. 12A, 12B, & 12C show a construction system according to example 1.
Figure 12B:
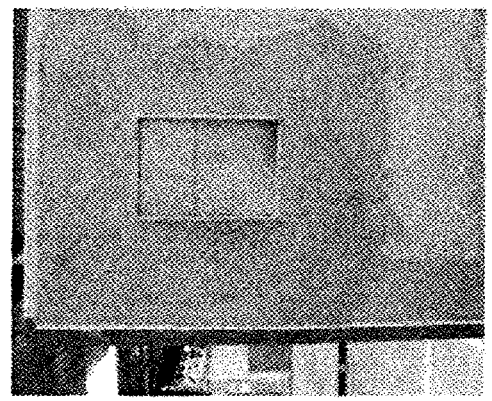
Figure 12A:
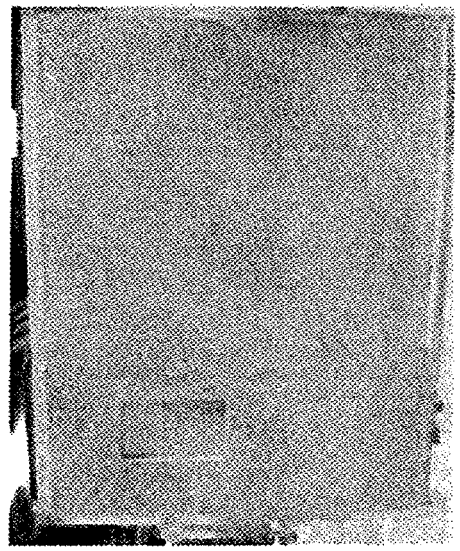

FIGS. 12A 12B & 12C show:

12A: insulating mortar based on sunflower pith after smoothing with a ruler (wall surface area 7 m²).

12B: Covering corner beads with PAREXAL.

12C: Scraping finish with PAREXAL.

The insulating mortar is composed of a binder A (15 kg) and a filler B (100 L). The composition of the binder is as follows:

| Composition of binder A | | |
|---|---|---|
| A1. Primary inorganic binder | Hydraulic Lime HL 3.5 (Lafarge) | 34.97% |
| | Sulfoaluminate Cement I.Tech ALICEM (Italcementi) | 15.00% |
| | Lime CL 90, hydrated | 20.00% |
| A2. Water retention agent | MHEC CULMINAL C8367 (Ashland) | 2.00% |
| A3. Surfactant | NANSA LSS 495/H (Huntsman) | 0.05% |
| A6. Inorganic spacer filler | Silicon sand DU 0.1-0.4 | 15.07% |
| A5. Inorganic lubricating filler | SILICA FUME | 8.00% |
| A7. Water repellent admixture | MAGNESIUM STEARATE | 0.23% |

Filler B is composed of 90% sunflower pith particles. This filler B is obtained from sunflower stalks harvested in the Rhone-Alpes. The transformation process used is as follows:

1. After harvesting the flower heads, the sunflower stalks are left on the field for sufficient time to reach a moisture content of less than 30%.
2. The stalks are silaged with a harvester usually used to harvest sunflower heads (e.g. CLAAS 830 forage harvester).
3. The silage product is then milled using a hammer mill (such as Electra Goulu N).
4. The ground material consisting of stalk particles (skin and pith) is sieved through a vibrating screen (such as RITEC) to obtain a particle size of less than 15 mm.
5. The separation of skin and pith is carried out using a gravity table (such as CIMBRIA).

Figure 13:
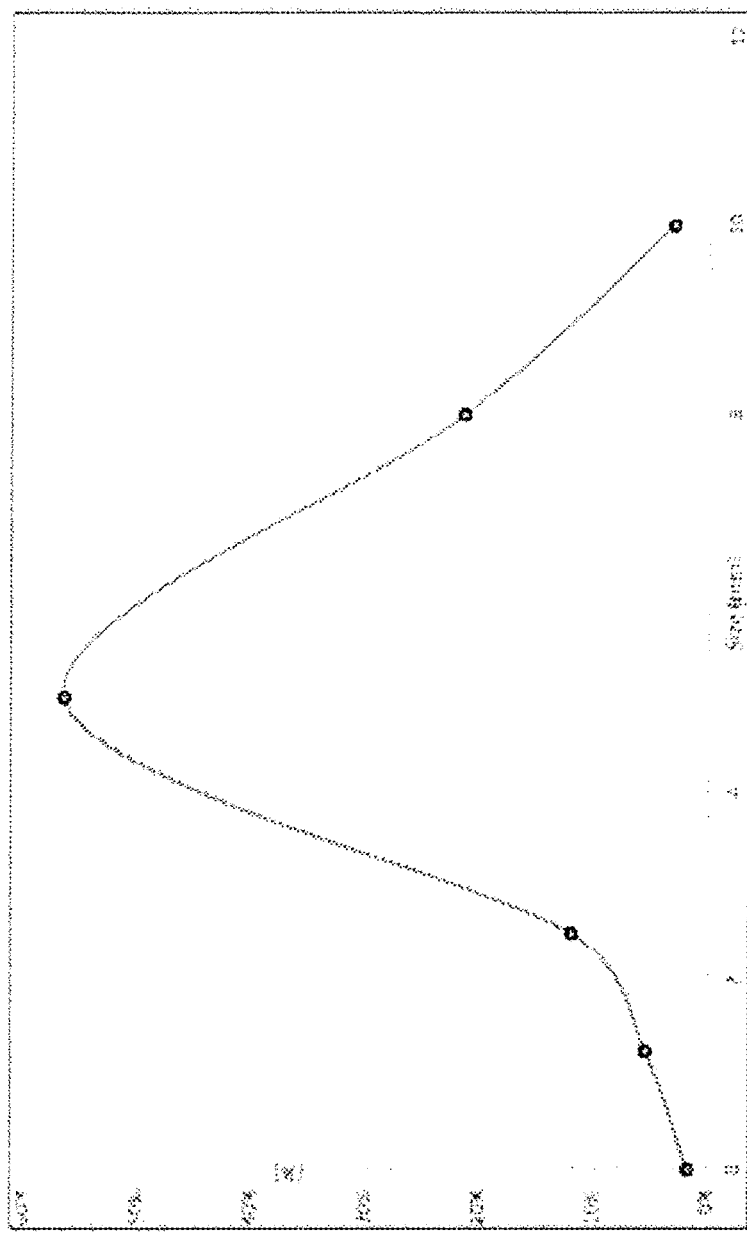
FIG. 13 shows the particle size distribution of an aggregate B which originates from the sunflower pith of Example 1.

Particle size analysis of the filler B was carried out by sieving: the maximum size is less than 12 mm. The density of the filler B according to method M1 is 30 kg/m³. The appended FIG. 13 gives the particle size distribution of the aggregate B obtained from sunflower pith.

| Composition of insulating mortar | |
|---|---|
| A. Binder [kg] | 15 |
| B. Filler Sunflower pith: | |
| Volume [L] | 100 |
| Mass [kg] | 3 |
| Ratio volume/weight Filler B/Binder A [L/kg] | 6.67 |
| Ratio weight/weight Binder A/Filler B [kg/kg] | 5 |
| Water [g] | 24 |
| Mass ratio Water/Binder A | 1.6 |

-continued

| Pumping pressure and flow rate | |
|---|---|
| Pumping flow rate dry/10 L | 23 |
| Pumping pressure [Bar] | 9 |
| Paste and hardened density | |
| Density at end of mixing [kg/m3] | 570 |
| Density exiting nozzle [kg/m3] | 700 |
| Hardened density [kg/m3] | 225 |
| Thermal conductivity (20° C. and 50% RH) | |
| Guarded hot plate measurement [W/mk] | 0.062 |

Conditions and Technique for Making Use of Insulating Mortar Based on Sunflower Pith:

Rendering machine: Putzmeister P11, screw pump water set to 5 bar, hose diameter 35 mm and 25 mm, pipe lengths 25 m Rendering spray gun with 14 mm frustoconical nozzle.

Mixing: 1) add all the mixing water, 2) simultaneously add binder A and filler B; 3) mix for 5 minutes and add additional water if needed to obtain the desired workability.

Use by spraying in successive passes of 3 cm.

Level with ruler to smooth the surface.

The finishing plaster (PAREXAL—single-layer lime plaster manufactured by PAREX GROUP SA) is applied 48 hours after the last pass of insulating mortar. After the corner beads are put in place, the finishing plaster is applied in one pass (final thickness 10 mm).

28 days after applying the finishing plaster, the insulation system was evaluated according to the European ETAG 004 standard for External Thermal Insulation.

| Test walls created according to ETAG 004 | |
|---|---|
| Thickness of insulating mortar based on sunflower pith | 6 cm |
| Lime plaster scraped finish (PAREXAL - PAREX GROUP SA) | 1 cm |
| Time until can be covered by finishing plaster | 48 h |
| Performance after aging cycles according to ETAG 004 | |
| Cracks | No anomalies or cracks appear during aging cycles |
| Impact resistance | Exposure class I |
| Adhesion tests | Break in insulating mortar |
| Validation of insulating system according to ETAG 004 | System validated for exposure class I. |

Figure 14:
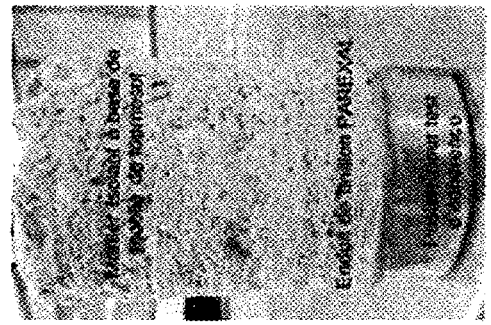
FIG. 14 shows a core sample of the insulating system, obtained after an adhesion test according to European Standard ETAG 004, in Example 1.

FIG. 14 shows a core sample of the insulating system obtained after an adhesion test according to the ETAG 004 European standard.

Example 2

Figure 15C:
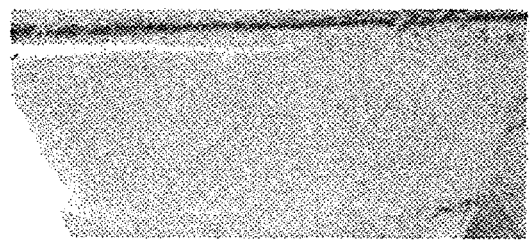
FIGS. 15A, 15B, 15C show spraying the insulating mortar to form construction systems according to the invention of Example 1.
Figure 15B:
Figure 15A:

Spraying an Insulating Mortar Based on Corn Pith Intended for the Thermal Insulation of Vertical Walls for ITI and ETI FIGS. 15A, 15B, 15C show the spraying of insulating mortar based on corn pith onto a vertical substrate of concrete blocks, the formula of the binder A being given below.

| Composition of binder A | | |
|---|---|---|
| A1. Inorganic primary binder | Hydraulic Lime HL 3.5 (Lafarge) | 34.97% |
| | Sulfoaluminate cement I.Tech ALICEM (Italcementi) | 15.00% |
| | Lime CL 90, hydrated | 20.00% |
| A2. Water retention agent | MHEC CULMINAL C8367 (Ashland) | 2.00% |
| A3. Surfactant | NANSA LSS 495/H (Huntsman) | 0.05% |
| A6. Inorganic spacer filler | Silicon sand DU 0.1-0.4 | 15.07% |
| A5. Inorganic lubricating filler | SILICA FUME | 8.00% |
| A7. Water repellent admixture | MAGNESIUM STEARATE | 0.23% |

The process for harvesting and transforming the corn pith was carried out as follows:
1. When harvesting corn cobs with a combine harvester, the corn stalk is ensiled in ventilated skips.
2. The separation of skin and pith is done according to the technique described in PCT W02015/180781.
3. Sieving by vibrating screen then obtains the desired particle size and eliminates skin residue.

The density of the aggregates B measured according to method M1 is 23.8 kg/m$^3$.

Figure 16:
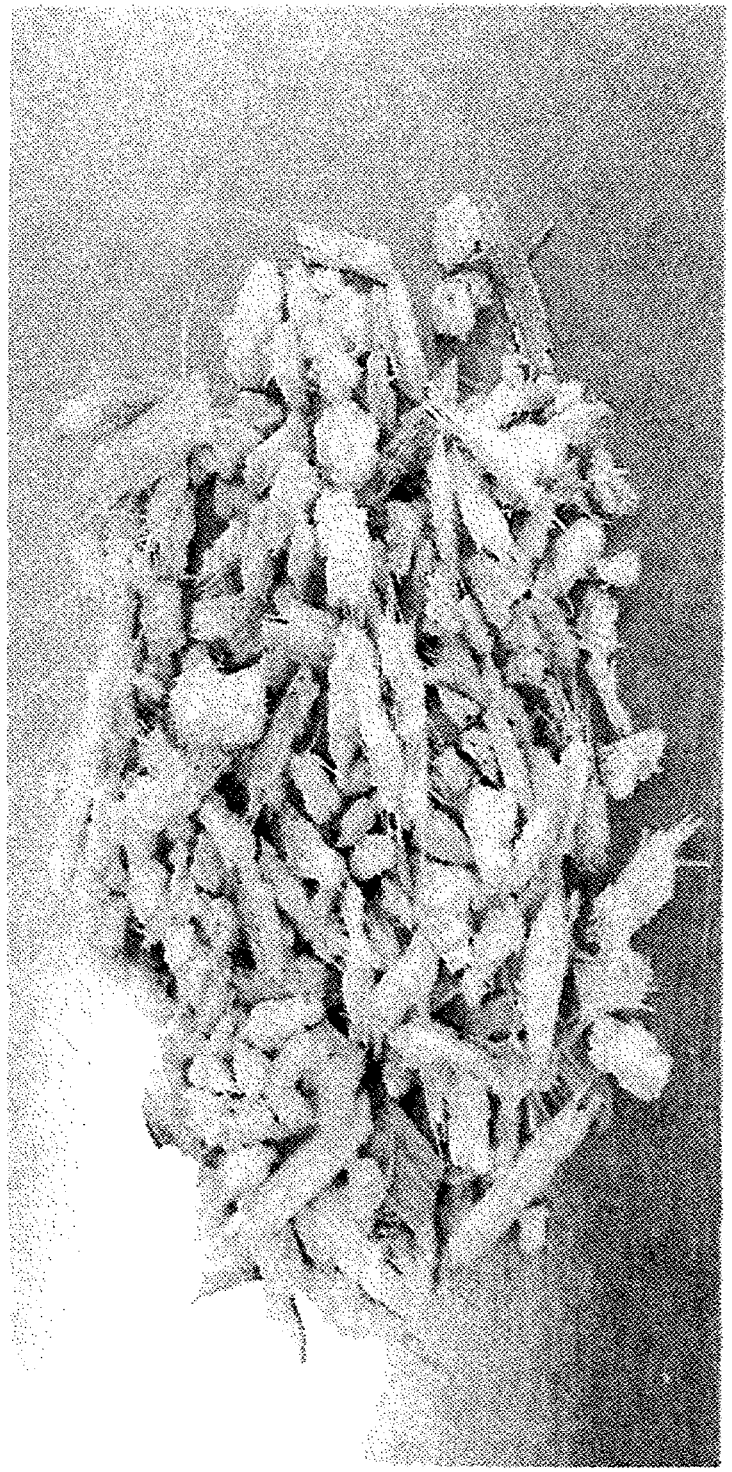
FIG. 16 shows the aggregates B of corn pith used in Example 2.

FIG. 16 shows the corn pith aggregates B used in this example 2.

The following table gives the composition and properties of the insulating mortar prepared in this Example 2 with the binder A, the aggregates B, and water.

| Composition of insulating mortar | |
|---|---|
| A. Binder [kg] | 12 |
| B. Filler Corn pith: | |
| Volume [L] | 84 |
| Mass [kg] | 2 |
| Ratio volume/weight Filler B/Binder A [L/kg] | 7 |
| Ratio weight/weight Binder A/Filler B [kg/kg] | 6 |
| Water [g] | 32 |
| Mass ratio Water/Binder A | 2.67 |
| Pumping flow rate and pressure | |
| Dry pumping flow rate/10 L | 28 |
| Pumping pressure [Bar] | 10 |
| Paste and hardened density | |
| Density at end of mixing [kg/m3] | 740 |
| Density exiting nozzle [kg/m3] | 820 |
| Hardened density [kg/m3] | 268 |
| Thermal conductivity (20° C. and 50% RH) | |
| Guarded hot plate measurement [W/mk] | 0.0645 |

Examples 3 to 7

This example shows the impact of the ratio of B/A (bio-sourced aggregate/binder) on the thermal conductivity lambda value <0.1 W/(mK) of the hardened insulation layer of the construction system according to the invention.

The filler B is composed of the same aggregate B as the one used for Example 1. The mixtures were made using a Perrier-type vertical axis planetary mixer. The mixing method used is as follows:
1. Introduce the water, filler B, and binder A.
2. Mix at 120 rpm for 3 min. Add additional water if necessary to obtain the desired consistency.

3. Re-homogenize the mixture by hand using the mixing paddle for 30 sec.
4. Restart the mixing for 2 min at 120 rpm.

The composition of the binder A is detailed in the following table:

| Composition Binder A | | |
|---|---|---|
| A1. Inorganic primary binder | Hydraulic Lime HL 3.5 (Lafarge) | 34.97% |
| | Sulfoaluminate cement I.Tech ALICEM (Italcementi) | 15.00% |
| | Lime CL 90, hydrated | 20.00% |
| A2. Water retention agent | MHEC CULMINAL C8367 (Ashland) | 2.00% |
| A3. Surfactant | NANSA LSS 495/H (Huntsman) | 0.05% |
| A6. Inorganic spacer filler | Silicon sand DU 0.1-0.4 | 15.07% |
| A5. Inorganic lubricating filler | SILICA FUME | 8.00% |
| A7. Water repellent admixture | MAGNESIUM STEARATE | 0.23% |

The increase in the ratio of B/A results in a decrease in the density and consequently in the thermal conductivity of the hardened insulation material.

| | EXAMPLES | | | | |
|---|---|---|---|---|---|
| | 3 | 4 | 5 | 6 | 7 |
| Binder A [g] | 240 | 200 | 150 | 100 | 50 |
| Aggregate B Sunflower pith: | | | | | |
| Volume [L] | 1.33 | 1.33 | 1.33 | 1.33 | 1.33 |
| Mass [g] | 40 | 40 | 40 | 40 | 40 |
| Ratio volume/weight Aggregate B/Binder A [L/kg] | 5.6 | 6.7 | 8.9 | 13.3 | 26.7 |
| Ratio weight/weight Binder A/Aggregate B [kg/kg] | 6 | 5 | 3.75 | 2.5 | 1.25 |
| Water [g] | 570 | 580 | 590 | 620 | 530 |
| Mass ratio Water/Binder A | 2.4 | 2.9 | 3.9 | 6.2 | 10.6 |
| Hardened density [kg/m3] | 258 | 208 | 167 | 107 | 72 |
| Thermal conductivity [W/mk] - guarded hot plate measurement (20° C. - 50% RH) | 0.058 | 0.053 | 0.049 | 0.045 | — |

Figure 17:
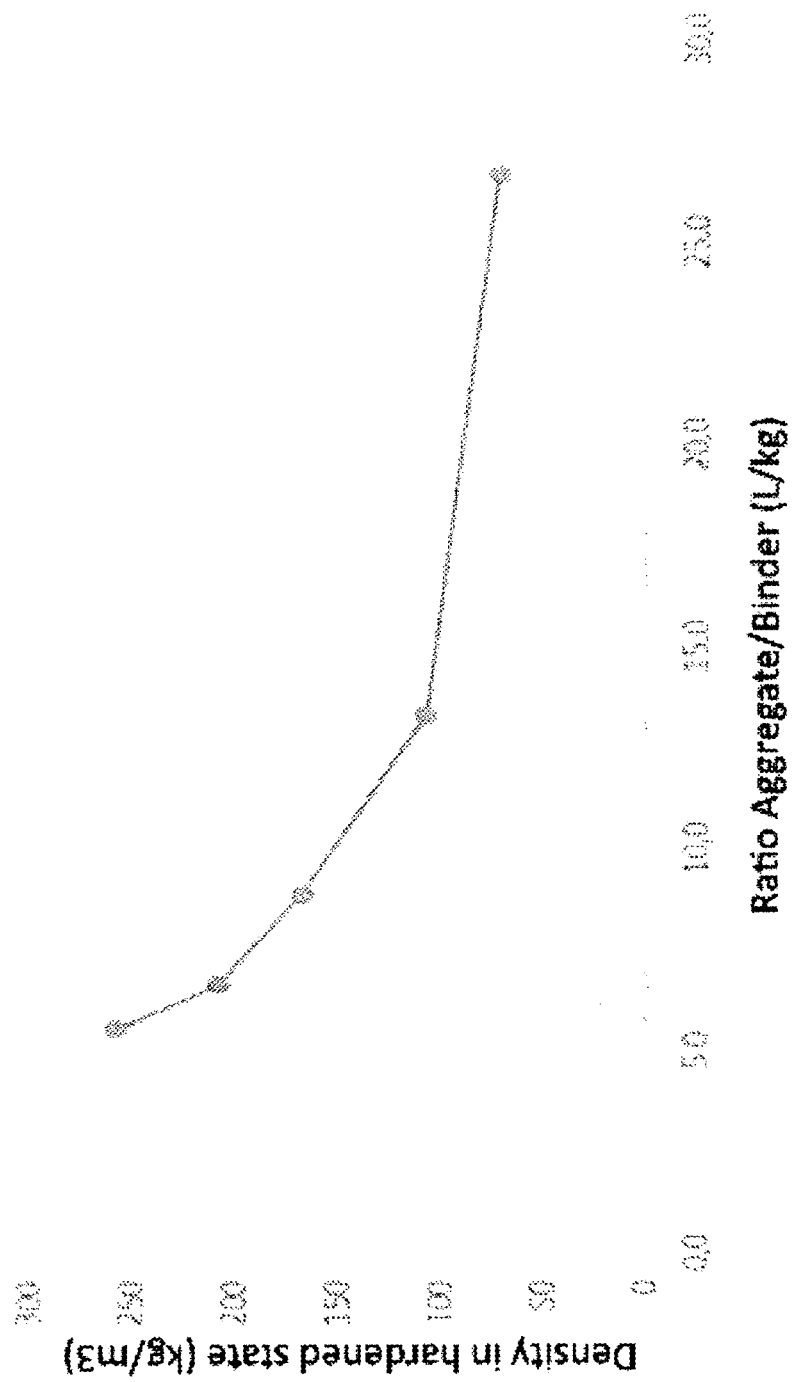
FIG. 17 shows the evolution of the density of the hardened insulation layer obtained in Examples 3 to 7, as a function of the ratio of Aggregate [L]/Binder [kg].

FIG. 17 shows the evolution of the density of the hardened insulation layer obtained in Examples 3 to 7, as a function of the ratio of Aggregate B [L]/Binder A [kg].

Figure 18:
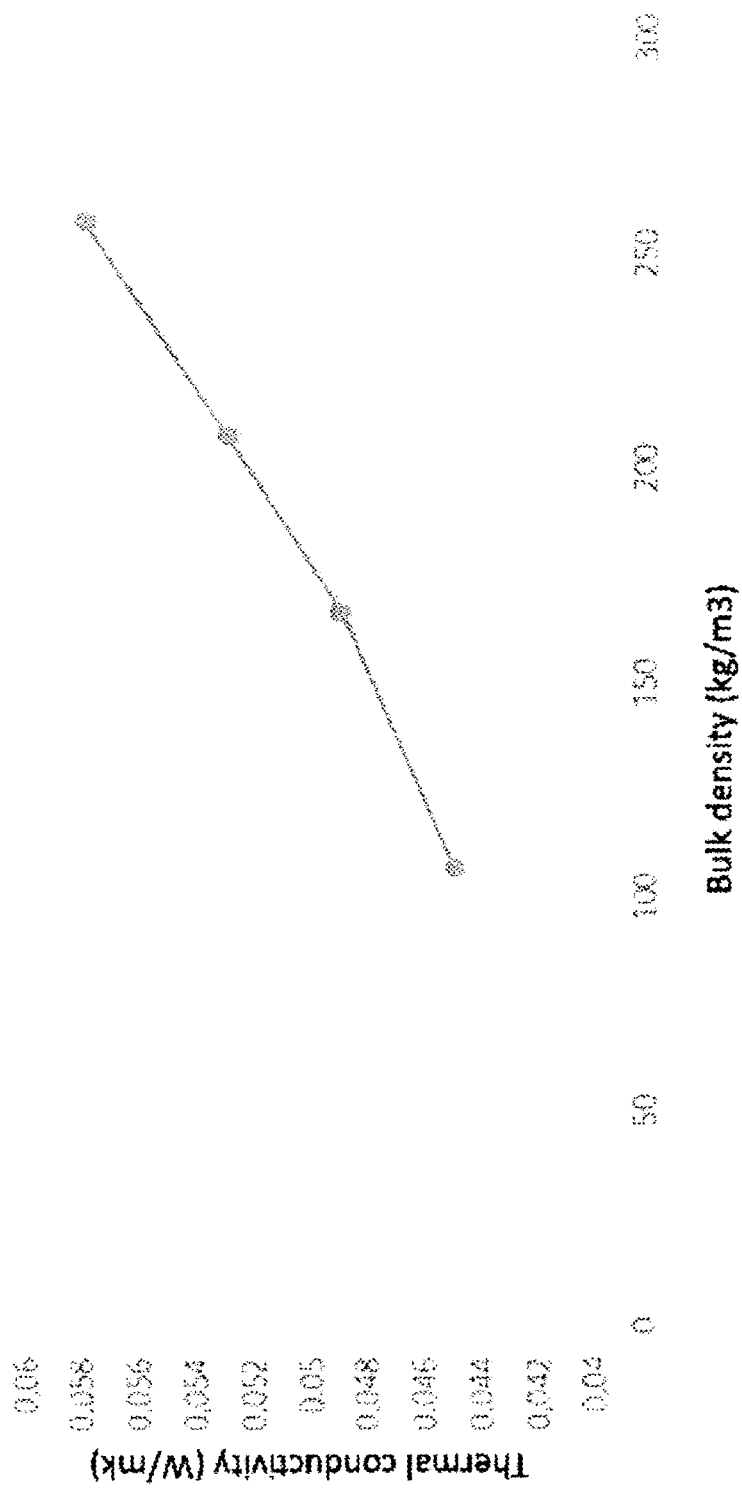
FIG. 18 shows the evolution of the thermal conductivity of the hardened insulation layer obtained in Examples 3 to 7, as a function of the density of the insulation material in the hardened state.

FIG. 18 shows the evolution of the thermal conductivity of the hardened insulation layer obtained in Examples 3 to 7, as a function of the density in the hardened state of the insulation material.

The invention claimed is:

1. A multilayer and insulating construction system for a building, that comprises
   a) at least one building member selected from the group consisting of a wall, a ceiling, and a floor,
   b) at least one hardened insulation layer associated with the building member, wherein the hardened insulation layer:
      (i) has a maximum thickness of between 1 and 60 cm;
      (ii) has a Bulk Density (BD) in kg/m³ that is less than or equal to 450; and
      (iii) is prepared by mixing, with water, a dry composition (d) comprising:
         -A- at least one binder composition including:
         A1- at least one binder that is a hydraulic binder or an air binder; and
         -B- at least one bio-sourced aggregate based on sunflower stalk and/or corn stalk and/or rape stalk, the bio-sourced aggregate -B- having a Bulk Density (BD) in kg/m³ that is less than 110, and the bio-sourced aggregate including stalk pith in an amount of >99 weight % on a dry basis;
      and wherein the dry composition has a ratio of A/B [mass of the binder composition -A- in kg on a dry basis]/ [mass of the bio-sourced aggregate -B- in kg on a dry basis] that is between 1 and 15.

2. The system according to claim 1, wherein the at least one building member and the at least one hardened insulation layer form prefabricated members that are configured to be assembled on site for the construction of the building.

3. The system according to claim 1, wherein the at least one building member and the at least one hardened insulation layer form unitary masonry members that are configured to be assembled on site for the construction of the building or parts of the building.

4. The system according to claim 1, wherein the hardened insulation layer is interposed between one of the at least one building member and (i) at least one other of the at least one building member and/or (ii) at least one other layer of a material different from the hardened insulation layer.

5. The system according to claim 1, wherein the hardened insulation layer has a thermal conductivity λ that is less than 0.09 W/mK.

6. The system according to claim 1, wherein the stalk pith is in the form of particles having a form factor F, defined as the ratio of the largest dimension of the particles to the smallest dimension, of F≤3.

7. The system according to claim 1, wherein the binder A1 is selected from the group consisting of cements, air lime, hydraulic lime, slags, geopolymers, metakaolins, binders with a high content of cementitious phases rich in alumina, natural pozzolans, sodium silicates, potassium silicates, lithium silicates, organic binders, and combinations thereof.

8. The system according to claim 1, wherein the binder composition A comprises - as % weight/weight on a dry basis:
   -A1- the at least one binder: 5-95;
   -A2- at least one water retention agent: 0.1-5;
   -A3- at least one surfactant: 0-2;
   -A4- a secondary binder: 0-85;
   -A5- an inorganic lubricating filler having a particle size d90 that is less than 100 μm: 0-40;
   -A6- an inorganic spacer filler having a particle size d90 that is greater than or equal to 100 μm: 0-40;
   -A7- a water-repellent admixture: 0-1.5;
   -A8- a set retardant admixture: 0-3;
   -A9- a set accelerator admixture: 0-3; and
   -A10- a thickening admixture: 0-2.

9. The system according to claim 1, wherein the system is an External Thermal Insulation system (ETI) or an Internal Thermal Insulation system (ITI).

10. A plurality of unitary masonry members that are configured to be assembled together on site for the construction of the building or parts of the building, each of the unitary masonry members comprising (i) at least one building member selected from the group consisting of a wall, a ceiling, and a floor; and (ii) at least one hardened insulation layer associated with the at least one building member, and wherein the hardened insulation layer:
  (i) has a maximum thickness of between 1 and 60 cm,
  (ii) has a Bulk Density (BD) in kg/m$^3$ that is less than or equal to 450; and
  (iii) is prepared by mixing, with water, a dry composition (d) comprising:
  -A- at least one binder composition including:
    A1- at least one binder that is a hydraulic binder or an air binder;
  -B- at least one bio-sourced aggregate based on sunflower stalk and/or corn stalk and/or rape stalk, the bio-sourced aggregate -B- having a Bulk Density (BD) in kg/m$^3$ that is less than 110, and the bio-sourced aggregate including stalk pith in an amount of >99 weight % on a dry basis;
  wherein the dry composition has a ratio of A/B [mass of the binder composition -A- in kg on a dry basis]/[mass of the bio-sourced aggregate - B- in kg on a dry basis] that is between 1 and 15.

11. A method for manufacturing the construction system according to claim 1, comprising:
  (i) mixing the binder composition A, the bio-sourced aggregate B, and the water to obtain a wet hardenable composition;
  (ii) shaping the wet hardenable composition to obtain a layer; and
  (iii) allowing this layer to dry in order to obtain the hardened insulation layer.

12. The method according to claim 11, wherein the shaping (ii) is carried out by spraying the wet hardenable composition on a substrate that is formed by the building member of the construction system and/or by pouring the wet hardenable composition into a mold.

13. The method according to claim 11, wherein the shaping (ii) is achieved
  by spraying the wet hardenable composition:
    on a vertical or inclined substrate,
    or to fill a wood or metal framework structure on site, or
  by pouring or spraying and spreading the wet hardenable composition on a horizontal plane on the floor to create a screed or by spraying the wet hardenable composition on a raised horizontal plane to create a ceiling;
or
  by pouring the wet hardenable composition into a formwork to create a wall, filling the wet hardenable composition between two walls, or pouring the wet hardenable composition into a mold to create prefabricated unitary masonry members.

* * * * *